United States Patent
Kimionis et al.

(10) Patent No.: US 12,442,913 B2
(45) Date of Patent: Oct. 14, 2025

(54) BACKSCATTER LOCALIZATION

(71) Applicant: Nokia Technologies Oy, Espoo (FI)

(72) Inventors: Ioannis Kimionis, Murray Hill, NJ (US); Michael Eggleston, Columbus, OH (US)

(73) Assignee: Nokia Technologies Oy, Espoo (FI)

( * ) Notice: Subject to any disclaimer, the term of this patent is extended or adjusted under 35 U.S.C. 154(b) by 444 days.

(21) Appl. No.: 18/047,005

(22) Filed: Oct. 17, 2022

(65) Prior Publication Data
US 2023/0176207 A1 Jun. 8, 2023

(30) Foreign Application Priority Data
Nov. 3, 2021 (EP) .................................. 21206119

(51) Int. Cl.
*G01S 13/87* (2006.01)
*G01S 13/75* (2006.01)
*H04W 64/00* (2009.01)

(52) U.S. Cl.
CPC .......... *G01S 13/878* (2013.01); *G01S 13/75* (2013.01); *H04W 64/00* (2013.01)

(58) Field of Classification Search
CPC ...... G01S 13/003; G01S 13/75; G01S 13/878; G01S 5/14; H04W 64/00; H04W 84/12
See application file for complete search history.

(56) References Cited

U.S. PATENT DOCUMENTS

| | | |
|---|---|---|
| 8,922,375 B2 | 12/2014 | Carrender et al. |
| 9,116,237 B2 | 8/2015 | Zhou et al. |
| 10,338,205 B2 | 7/2019 | Zhang |
| 2008/0143482 A1 | 6/2008 | Shoarinejad et al. |
| 2008/0143584 A1 | 6/2008 | Shoarinejad et al. |
| 2020/0034583 A1 | 1/2020 | Nikitin et al. |
| 2020/0212956 A1 | 7/2020 | Gollakota et al. |

(Continued)

OTHER PUBLICATIONS

Dobkin, "The RF in RFID: Passive UHF RFID in Practice", Newnes (Elsevier), 2008, 505 pages.

(Continued)

*Primary Examiner* — Timothy X Pham
(74) *Attorney, Agent, or Firm* — Brake Hughes Bellermann LLP

(57) ABSTRACT

Disclosed herein are systems, methods and/or computer programs for backscatter localization of a tag using access point (AP) mode switching. The apparatus, may comprise means for: receiving distance information associated with at least two APs from a set of at least three APs. The distance information associated with each AP of the at least two APs may be determined based on: dynamically switching the role of said each AP in a different time interval to a transmission mode for transmitting a localization signal to a tag, with the other APs in the set of APs switched to a receiving mode for receiving a backscatter signal from the tag in response to the transmitted localization signal from said each AP. Distance information determined, by the other APs, may be associated with said each AP based on the received backscatter signals corresponding to the transmitted localization signal from said each AP. There may also be provided means for determining a location estimate of the tag based on the received distance information.

20 Claims, 7 Drawing Sheets

(56) References Cited

U.S. PATENT DOCUMENTS

| | | | |
|---|---|---|---|
| 2020/0241105 A1 | 7/2020 | Marshall | |
| 2021/0012071 A1 | 1/2021 | Lopez et al. | |
| 2022/0272504 A1* | 8/2022 | Hága | G01S 5/14 |
| 2022/0329980 A1* | 10/2022 | Mendes | H04W 4/029 |
| 2023/0038212 A1* | 2/2023 | Chaudhary | H04W 64/006 |

OTHER PUBLICATIONS

Kimionis et al., "Increased range bistatic scatter radio", IEEE Transactions on Communications, vol. 62, No. 3, Mar. 2014, 1091-1104.

Zhang et al., "HitchHike: Practical Backscatter Using Commodity WiFi", Proceedings of the 14th ACM Conference on Embedded Network Sensor Systems CD-ROM, Nov. 2016, 13 pages.

Zhou et al., "Phased-Based Composite Ranging for Backscatter RF Tags: System Analysis and Measurements", IEEE Transactions on Antennas and Propagation, vol. 66, No. 8, Aug. 2018, pp. 4202-4212.

Decarli, "On phase-based localization with narrowband backscatter signals", EURASIP Journal on Advances in Signal Processing, Article No. 70, Nov. 12, 2018, pp. 1-12.

Çiftler et al., "IoT Localization for Bistatic Passive UHF RFID Systems With 3-D Radiation Pattern", IEEE Internet of Things Journal, vol. 4, No. 4, Aug. 2017, pp. 905-916.

Weinstein, "RFID: a technical overview and its application to the enterprise", IT Professional, vol. 7, No. 3, May-Jun. 2005, pp. 27-33.

Liu et al., "Next generation backscatter communication: systems, techniques, and applications", EURASIP Journal on Wireless Communications and Networking, Article No. 69, Mar. 18, 2019, pp. 1-11.

Gong et al., "Backscatter-Aided Cooperative Relay Communications in Wireless-Powered Hybrid Radio Networks", IEEE Network, vol. 33, No. 5, Sep.-Oct. 2019, pp. 234-241.

Liu et al., "BackPos: High Accuracy Backscatter Positioning System", IEEE Transactions on Mobile Computing, vol. 15, No. 3, Mar. 1, 2016, pp. 586-598.

Extended European Search Report received for corresponding European Patent Application No. 21206119.6, dated May 3, 2022, 8 pages.

\* cited by examiner

BACKSCATTER LOCALIZATION

FIELD

Example embodiments may relate to systems, methods and/or computer programs for backscatter localization, for example of a tag using access point (AP) mode switching.

BACKGROUND

There is a growing need for ubiquitous, high-accuracy localization of assets and people in, for example, enterprise settings, such as office spaces, logistics centers, factories, and warehouses. This may be a critical enabler to the autonomous systems promised in Industry 4.0 to increase productivity and efficiency in these places. Existing solutions that provide positioning and localization may include satellite receivers (e.g. GPS chipsets in cell phones or trackers), active transmission of wireless signals from the object to be localized to an access point (e.g. Wi-Fi or Bluetooth trilateration), and optical systems (e.g. LiDAR), which are typically implemented with high cost components.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising means for: receiving distance information associated with at least two access points (APs) from a set of at least three APs, wherein the distance information associated with each AP of the at least two APs may be determined based on: dynamically switching the role of said each AP in a different time interval to a transmission mode for transmitting a localization signal to a tag, with the other APs in the set of APs switched to a receiving mode for receiving a backscatter signal from the tag in response to the transmitted localization signal from said each AP; and determining, by the other APs, distance information associated with said each AP based on the received backscatter signals corresponding to the transmitted localization signal from said each AP; and determining a location estimate of the tag based on the received distance information.

In some embodiments of the apparatus, when an AP of the set of APs may be in the receiving mode, said AP determines distance information for another AP of the set of APs that may be in the transmission mode with respect to said AP based on at least the received backscatter signal from the tag.

In some embodiments of the apparatus, the distance information associated with an AP comprising data representative of: one or more backscatter signal measurements performed by another AP in receiving mode when said AP may be in transmission mode; and/or a compound distance estimate with respect to said AP, the tag and the another AP that may be performed by said another AP in receiving mode when said AP may be in transmission mode.

The means may be further configured for coordinating, from a set of time intervals, when APs from the set of APs dynamically switch between the transmission mode and the receiving mode.

In some embodiments of the apparatus, the set of APs may be configured to coordinate with each other, over a set of time intervals, the dynamic switching of each AP between the transmission mode and the receiving mode.

In some embodiments of the apparatus, the set of APs may be each configured to randomly switch between the transmitting mode and the receiving mode, where the probability of each AP in the set of APs randomly switching to the receiving mode being greater than the probability of each AP in the set of APs randomly switching to the transmitting mode.

In some embodiments of the apparatus, where a designated AP of the set of APs may be configured to coordinate the dynamic switching of at least two APs in the set of APs between the transmitting mode to the receiving mode over a set of two or more time intervals, where each time interval in the set of time intervals has one of the at least two APs switched in the transmitting mode and the other of the at least two APs switched in the receiving mode.

In some embodiments of the apparatus, one of at least two APs from the set of APs may be configured to dynamically switch to the transmission mode during a time interval different to the other of said at least two APs and dynamically switch to a receiving mode before or after the time interval.

In some embodiments of the apparatus, a first AP of the set of APs may be configured to dynamically switch to the transmission mode for transmitting a first localization signal to the tag in a first time interval and the one or more other APs of the set of APs remain in the receiving mode for receiving a first backscatter signal from the tag corresponding to the first localization signal, where each AP of the other APs in the set of APs determine distance information for the first AP with respect to said each AP based on receiving the first backscatter signal; a second AP of the set of APs may be configured to dynamically switch from a receiving mode to a transmission mode for transmitting a second localization signal to the tag in a second time interval different to the first time interval, and the first AP may be configured to dynamically switch to the receiving mode for receiving, along with any other APs in the set of APs in the receiving mode, to receive a second backscatter signal from the tag corresponding to the second localization signal, where the first AP and said any remaining APs in the set of APs determine distance information for the second AP with respect to the first or said any remaining APs based on receiving the second backscatter signal; the means for receiving distance information for each AP in the set of APs may further comprise: receiving distance information for the first AP with respect to one or more of the other APs of the set of APs during the first time interval; and receiving distance information for the second AP with respect to one or more of the first AP and any remaining APs during the second time interval; and the means for determining a location of the tag may further comprise: determining the location of the tag based on the distance information received in the first and second time intervals.

In some embodiments of the apparatus, one or more further APs may each be configured for switching to a transmitting mode for transmitting a localization signal to the tag during a time interval of one or more further time intervals; the one or more further APs may each be configured for switching to a receiving mode for receiving a backscatter signal from the tag during another time interval of the one or more further time intervals whilst at least one of the further APs transmits a localization signal to the tag; the other APs may be configured for receiving one or more backscatter signals from the tag corresponding to the transmitted localization signals from the one or more further APs in said one or more further time intervals; and the means for receiving distance information may further comprise: receiving distance information from one or more of the APs of the plurality of APs during the one or more further time intervals; and the means for determining a location of the tag may further comprise: determining the location of the tag based on the distance information received in the first, second time and one or more further time intervals.

In some embodiments of the apparatus, the number of APs configured for transmitting a localization signal to the tag may be increased based on an accuracy requirement of the location estimate.

In some embodiments of the apparatus, the number of time intervals for APs to be dynamically switched to the transmission mode for transmitting a localization signal to the tag may be increased based on a required reduction in measurement noise in relation to the distance information.

In some embodiments of the apparatus, each backscatter signal from a tag may be modulated to enable each AP receiving said backscatter signal to determine distance information based on measurements associated with the modulation applied to said each backscatter signal.

In some embodiments of the apparatus, the localization signal transmitted by each AP to the tag may be a continuous wave carrier frequency localization signal.

In some embodiments of the apparatus, the localization signal transmitted by each AP to the tag may be a continuous wave (CW) carrier frequency signal, where the tag modulates a data signal onto a backscatter signal associated with the CW carrier frequency signal.

In some embodiments of the apparatus, the tag may offset the data signal modulated onto the backscatter signal associated with the CW carrier frequency signal by a predetermined frequency shift.

In some embodiments of the apparatus, each AP in the set of APs receiving the backscatter signal from the tag determines distance information for the transmitting AP with respect to said each AP based on calculating carrier phases of the received backscatter signal resulting from said transmitting AP transmitting localization signals to the tag, and said each AP sending said determined distance information to said apparatus.

In some embodiments of the apparatus, the localization signal transmitted from an AP in the set of APs in the transmission mode may further include multiple frequency tones, and the APs in the set of APs in the receiving mode may each receive a backscatter signal from the tag in response to the multiple frequency tones of the localization signal transmitted to the tag, the received distance information for the AP in the transmission mode with respect to each of the APs in the set of APs in the receiving mode may include a plurality of phase measurements associated with the resulting backscatter signals.

The means for determining the distance information for an AP may further comprise: determining distance information for an i-th AP further comprising calculating a compound distance between an i-th transmitting AP, the tag, and a j-th receiving AP, denoted $d_i + d_j$, based on:

$$d_i + d_j = \frac{c}{2\pi N} \sum_{n=1}^{N-1} \left| \frac{\varphi_{ij_n} - \varphi_{ij_{n+1}}}{f_n - f_{n+1}} \right|,$$

where N is the number of frequency tones of a localization signal transmitted by the i-th AP, $\varphi_{ij_n}$ is the n-th phase measurement measured by j-th AP of the backscatter signal corresponding to an n-th frequency tone, $f_n$, of the localization signal transmitted by the i-th AP, where $1 \leq n \leq N$.

In some embodiments of the apparatus, the tag may be part of a multistatic network comprising a plurality of tags, where said tag may be configured to modify the backscatter signal transmitted from the tag based on at least one multiplexing/multiple access scheme from the group of: code division multiple access (CDMA); frequency division multiple access (FDMA); time division multiple access (TDMA); space division multiple access (SDMA); and/or any other multiple access or multiplexing scheme for minimizing interference of backscatter signals between tags of the multistatic network.

In some embodiments of the apparatus, the distance information for each AP received from one or more of the APs may be based on measurements of backscatter signals by said one or more APs in relation to at least one from the group of: phased-based localization or ranging; frequency-modulated continuous wave (FMCW) based localization or ranging; dual frequency continuous wave (DFCW) based localization or ranging; multi-frequency continuous wave (MFCW) based localization or ranging; time of arrival (ToA) based localization or ranging; received signal strength indication (RSSI) based localization or ranging; or any other type of localization or ranging technique.

In some embodiments, the apparatus may be a cloud platform, edge cloud, edge device, or other device and the APs are configured to stream the corresponding determined distance information to the cloud platform, edge cloud, edge device, or other device.

In some embodiments, the apparatus may be part of a designated or master AP and the other APs in the set of APs may be configured to transmit the corresponding distance information to the designated or master AP.

According to a second aspect, there is described a method comprising: receiving distance information associated with at least two access points (APs) in a set of at least three APs, wherein the distance information associated with each AP of the at least two APs may be determined based on: dynamically switching the role of said each AP in a different time interval to a transmission mode for transmitting a localization signal to a tag, with the other APs in the set of APs switched to a receiving mode for receiving a backscatter signal from the tag in response to the transmitted localization signal from said each AP; and determining, by the other APs, distance information associated with said each AP based on received backscatter signals associated with the transmitted localization signal from said each AP; and determining a location estimate of the tag based on the received distance information.

In some embodiments of the method, when an AP of the set of APs may be in the receiving mode, said AP determines distance information for another AP of the set of APs that may be in the transmission mode with respect to said AP based on at least the received backscatter signal from the tag.

In some embodiments of the method, the distance information associated with an AP comprising data representative of: one or more backscatter signal measurements performed by another AP in receiving mode when said AP may be in transmission mode; and/or a compound distance estimate with respect to said AP, the tag and the another AP that may be performed by said another AP in receiving mode when said AP may be in transmission mode.

The method may be further configured for coordinating, from a set of time intervals, when APs from the set of APs dynamically switch between the transmission mode and the receiving mode.

In some embodiments of the method, the set of APs may be configured to coordinate with each other, over a set of time intervals, the dynamic switching of each AP between the transmission mode and the receiving mode.

In some embodiments of the method, the set of APs may be each configured to randomly switch between the transmitting mode and the receiving mode, where the probability of each AP in the set of APs randomly switching to the receiving mode being greater than the probability of each AP in the set of APs randomly switching to the transmitting mode.

In some embodiments of the method, where a designated AP of the set of APs may be configured to coordinate the dynamic switching of at least two APs in the set of APs between the transmitting mode to the receiving mode over a set of two or more time intervals, where each time interval in the set of time intervals has one of the at least two APs switched in the transmitting mode and the other of the at least two APs switched in the receiving mode.

In some embodiments of the method, one of at least two APs from the set of APs may be configured to dynamically switch to the transmission mode during a time interval different to the other of said at least two APs and dynamically switch to a receiving mode before or after the time interval.

In some embodiments of the method, a first AP of the set of APs may be configured to dynamically switch to the transmission mode for transmitting a first localization signal to the tag in a first time interval and the one or more other APs of the set of APs remain in the receiving mode for receiving a first backscatter signal from the tag corresponding to the first localization signal, where each AP of the other APs in the set of APs determine distance information for the first AP with respect to said each AP based on receiving the first backscatter signal; a second AP of the set of APs may be configured to dynamically switch from a receiving mode to a transmission mode for transmitting a second localization signal to the tag in a second time interval different to the first time interval, and the first AP may be configured to dynamically switch to the receiving mode for receiving, along with any other APs in the set of APs in the receiving mode, to receive a second backscatter signal from the tag corresponding to the second localization signal, where the first AP and said any remaining APs in the set of APs determine distance information for the second AP with respect to the first or said any remaining APs based on receiving the second backscatter signal; the method step of receiving distance information for each AP in the set of APs may further comprise: receiving distance information for the first AP with respect to one or more of the other APs of the set of APs during the first time interval; and receiving distance information for the second AP with respect to one or more of the first AP and any remaining APs during the second time interval; and the method step for determining a location of the tag may further comprise: determining the location of the tag based on the distance information received in the first and second time intervals.

In some embodiments of the method, one or more further APs may each be configured for switching to a transmitting mode for transmitting a localization signal to the tag during a time interval of one or more further time intervals; the one or more further APs may each be configured for switching to a receiving mode for receiving a backscatter signal from the tag during another time interval of the one or more further time intervals whilst at least one of the further APs transmits a localization signal to the tag; the other APs may be configured for receiving one or more backscatter signals from the tag corresponding to the transmitted localization signals from the one or more further APs in said one or more further time intervals; and the method step of receiving distance information may further comprise: receiving distance information from one or more of the APs of the plurality of APs during the one or more further time intervals; and the method step of determining a location of the tag may further comprise: determining the location of the tag based on the distance information received in the first, second time and one or more further time intervals.

In some embodiments of the method, the number of APs configured for transmitting a localization signal to the tag may be increased based on an accuracy requirement of the location estimate.

In some embodiments of the method, the number of time intervals for APs to be dynamically switched to the transmission mode for transmitting a localization signal to the tag may be increased based on a required reduction in measurement noise in relation to the distance information.

In some embodiments of the method, each backscatter signal from a tag may be modulated to enable each AP receiving said backscatter signal to determine distance information based on measurements associated with the modulation applied to said each backscatter signal.

In some embodiments of the method, the localization signal transmitted by each AP to the tag may be a continuous wave carrier frequency localization signal.

In some embodiments, of the method the localization signal transmitted by each AP to the tag may be a CW carrier frequency signal, where the tag modulates a data signal onto a backscatter signal associated with the CW carrier frequency signal.

In some embodiments of the method, the tag may offset the data signal modulated onto the backscatter signal associated with the CW carrier frequency signal by a predetermined frequency shift.

In some embodiments of the method, each AP in the set of APs receiving the backscatter signal from the tag determines distance information for the transmitting AP with respect to said each AP based on calculating carrier phases of the received backscatter signal resulting from said transmitting AP transmitting localization signals to the tag, and said each AP sending said determined distance information to said apparatus.

In some embodiments of the method, the localization signal transmitted from an AP in the set of APs in the transmission mode may further include multiple frequency tones, and the APs in the set of APs in the receiving mode may each receive a backscatter signal from the tag in response to the multiple frequency tones of the localization signal transmitted to the tag, the received distance information for the AP in the transmission mode with respect to each of the APs in the set of APs in the receiving mode may include a plurality of phase measurements associated with the resulting backscatter signals.

The method step of determining the distance information for an AP may further comprise: determining distance information for an i-th AP further comprising calculating a compound distance between an i-th transmitting AP, the tag, and a j-th receiving AP, denoted $d_i + d_j$, based on:

$$d_i + d_j = \frac{c}{2\pi N} \sum_{n=1}^{N-1} \left| \frac{\varphi_{ij_n} - \varphi_{ij_{n+1}}}{f_n - f_{n+1}} \right|,$$

where N is the number of frequency tones of a localization signal transmitted by the i-th AP, $\varphi_{ij_n}$ is the n-th phase measurement measured by j-th AP of the backscatter signal corresponding to an n-th frequency tone, $f_n$, of the localization signal transmitted by the i-th AP, where $1 \le n \le N$.

In some embodiments of the method, the tag may be part of a multistatic network comprising a plurality of tags, where said tag may be configured to modify the backscatter signal transmitted from the tag based on at least one multiplexing/multiple access scheme from the group of: code division multiple access (CDMA); frequency division multiple access (FDMA); time division multiple access (TDMA); space division multiple access (SDMA); and/or any other multiple access or multiplexing scheme for minimizing interference of backscatter signals between tags of the multistatic network.

In some embodiments of the method, the distance information for each AP received from one or more of the APs may be based on measurements of backscatter signals by said one or more APs in relation to at least one from the group of: phased-based localization or ranging; frequency-modulated continuous wave (FMCW) based localization or ranging; dual frequency continuous wave (DFCW) based localization or ranging; multi-frequency continuous wave (MFCW) based localization or ranging; time of arrival (ToA) based localization or ranging; received signal strength indication (RSSI) based localization or ranging; or any other type of localization or ranging technique.

According to a third aspect, there is described an AP apparatus, comprising means for: dynamically switching between a transmission mode and a receiving mode based on a coordination scheme with one or more other APs; in response to switching to the transmission mode, the means may be configured for transmitting a localization signal to a tag; and in response to switching to the receiving mode, the means may be configured for: receiving one or more backscatter signals from the tag, each backscatter signal resulting from the tag receiving a transmitted localization signal from one or more of the other APs in the transmission mode; determining distance information associated with one or more other APs in the transmission mode with respect to the apparatus based on the corresponding received backscatter signals from the tag; and sending or using the determined distance information for location estimation of the tag.

According to a fourth aspect, there is described an AP method comprising: dynamically switching, by an AP of a set of APs, between a transmission mode and a receiving mode based on a coordination scheme with one or more other APs of the set of APs; in response to dynamically switching to the transmission mode, transmitting a localization signal to a tag; and in response to dynamically switching to the receiving mode, performing the steps of: receiving one or more backscatter signals from the tag, each backscatter signal resulting from the tag receiving a transmitted localization signal from another one or more APs of the plurality of APs in the transmission mode; determining distance information associated with the other one or more APs in the transmission mode with respect to said AP based on the one or more received backscatter signals from the tag; and sending or using the determined distance information in location estimation of the tag.

The AP method of the fourth aspect may also perform operations according to any preceding method definition of the second aspect.

According to a fifth aspect, there is provided a computer program product comprising a set of instructions which, when executed on an apparatus, is configured to cause the apparatus to carry out the method of any preceding method definition.

According to a sixth aspect, there is provided a non-transitory computer readable medium comprising program instructions stored thereon for performing a method, comprising: receiving distance information associated with at least two APs in a set of at least three APs, wherein the distance information associated with each AP of the at least two APs may be determined based on: dynamically switching the role of said each AP in a different time interval to a transmission mode for transmitting a localization signal to a tag, with the other APs in the set of APs switched to a receiving mode for receiving a backscatter signal from the tag in response to the transmitted localization signal from said each AP; and determining, by the other APs, distance information associated with said each AP based on received backscatter signals associated with the transmitted localization signal from said each AP; and determining a location estimate of the tag based on the received distance information.

The program instructions of the sixth aspect may also perform operations according to any preceding method definition of the second aspect.

According to a seventh aspect, there is provided a non-transitory computer readable medium comprising program instructions stored thereon for performing an AP method, comprising: dynamically switching, by an AP of a set of APs, between a transmission mode and a receiving mode based on a coordination scheme with one or more other APs of the set of APs; in response to dynamically switching to the transmission mode, transmitting a localization signal to a tag; and in response to dynamically switching to the receiving mode, performing the steps of: receiving one or more backscatter signals from the tag, each backscatter signal resulting from the tag receiving a transmitted localization signal from another one or more APs of the plurality of APs in the transmission mode; determining distance information associated with the other one or more APs in the transmission mode with respect to said AP based on the one or more received backscatter signals from the tag; and sending or using the determined distance information in location estimation of the tag.

The program instructions of the seventh aspect may also perform operations according to any preceding method definition of the second or fourth aspect.

According to an eighth aspect, there is provided an apparatus comprising: at least one processor; and at least one memory including computer program code which, when executed by the at least one processor, causes the apparatus: to receive distance information associated with at least two APs from a set of at least three APs, where the distance information associated with each AP of the at least two APs may be determined based on: dynamically switching the role of said each AP in a different time interval to a transmission mode for transmitting a localization signal to a tag, with the other APs in the set of APs switched to a receiving mode for receiving a backscatter signal from the tag in response to the transmitted localization signal from said each AP; and to determine, by the other APs, distance information associated with said each AP based on the received backscatter signals corresponding to the transmitted localization signal from said each AP; and to determine a location estimate of the tag based on the received distance information.

The computer program code of the eighth aspect may also perform operations according to any preceding method definition of the second aspect.

According to a ninth aspect, there is provided an apparatus comprising: at least one processor; and at least one memory including computer program code which, when executed by the at least one processor, causes the apparatus: to receive distance information associated with at least two APs from a set of at least three APs, where the distance information associated with each AP of the at least two APs may be determined based on: dynamically switching the role of said each AP in a different time interval to a transmission mode for transmitting a localization signal to a tag, with the other APs in the set of APs switched to a receiving mode for receiving a backscatter signal from the tag in response to the transmitted localization signal from said each AP; and to determine, by the other APs, distance information associated with said each AP based on the received backscatter signals corresponding to the transmitted localization signal from said each AP; and to determine a location estimate of the tag based on the received distance information.

The computer program code of the ninth aspect may also perform operations according to any preceding method definition of the second or fourth aspects.

BRIEF DESCRIPTION OF THE DRAWINGS

Example embodiments will now be described by way of non-limiting example, with reference to the accompanying drawings, in which.

DETAILED DESCRIPTION

Figure 1:
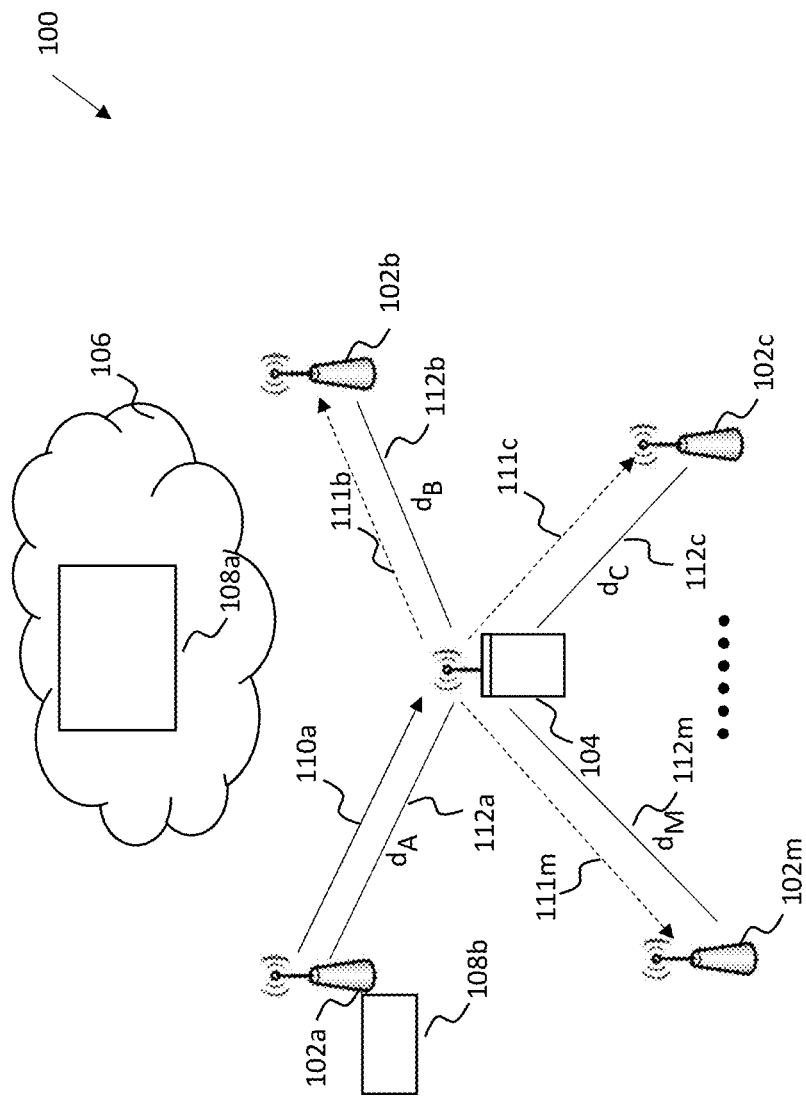
FIG. 1 is a schematic view of a localization system in relation to a plurality of access points and a backscatter tag, useful for understanding example embodiments.

As alluded to above, there is a growing need for localization of assets and people in various settings, e.g. enterprise settings, such as office spaces, logistics centers, factories, and warehouses, where backscatter tags or devices may be used. Backscatter tags or devices may be battery-operated or battery-less devices which achieve communication via backscatter signal modulation, i.e. signal transmission by means of reflection rather than active radiation. Some common tags such as UHF Radio Frequency Identification (RFID) tags that act as "wireless barcodes" and backscatter a static pre-coded ID. These RFID tag systems use monostatic readers that have limited read ranges. However, monostatic systems have to be full duplex by design as transmitter and receiver parts have to be on the same frequency channel for capturing the backscattered signals. This is not practical for localizing the tags with most commercial access points (APs) (e.g. Wi-Fi or 3G-5G APs), which may employ different uplinks/downlinks and/or multiple access schemes such as, without limitation for example time-division duplex (TDD) or frequency division duplex (FDD) communications and the like. Conventional, tag based systems using such APs may have detached illuminator/transmitter parts from the receiver part of a reader, e.g. a bistatic architecture, which enables backscatter devices to communicate over an extended range and achieve larger area coverage with multiple illuminators and readers and tags. However, such systems lead to complex arrangements, e.g. directional antennas and/or three-dimensional (3D) beam patterns for performing localization of tags, some of which assume the distance from illuminator to reader is the same.

Example embodiments may relate to systems, apparatus, methods and/or computer programs for determining a location estimate of, for example, a backscatter tag or a device employing a backscatter radio (hereinafter referred to as a tag) using distance information with respect to the tag (e.g. distance measurement information, backscatter measurements, and/or distance estimations) based on localization signals transmitted from each AP in a set of APs over different time intervals, instances or periods (referred to herein as time intervals). In each time interval other APs that are not transmitting a localisation signal in the set of APs are configured to receive the resulting backscatter signals from the tag and determine distance information (e.g. distance measurement information, backscatter measurements, and/or distance estimations). The distance information generated by the APs over two or more time intervals may be processed and used to localise the tag.

In example embodiments, the localization system may be a bistatic or multistatic backscatter system in which localization estimation of the tag may be performed by dynamically switching the role of the transmitter and receiver of each AP between different APs in the set of APs over time. For example, for each time interval, an AP in the set of APs is configured in a transmitting mode and the other APs in the set of APs are configured in a receiving mode, where in subsequent time intervals the AP changes to a receiving mode and another AP in the set of APs changes to a transmitting mode. By doing this in a systematic fashion, ambiguity between path lengths from the APs in the set and the tag can be eliminated allowing for precise localization of the backscatter tag. This technique could be used in a custom wireless system, but could also be used in existing wireless or telecommunication networks, for example to allow traditional Wi-Fi APs to be used for backscatter tag localization without the need to deploy any new or custom hardware.

FIG. 1 shows a schematic view of a localization system 100 including a plurality of access points (APs) 102a-102m or a set of APs 102a-102m having an associated radio frequency (RF) antenna for wireless communications with a backscatter tag 104 (or tag). Each of the APs 102a-102m may comprise or represent, for example, any type of communication device capable of transmitting signals 110a to the tag 104 and/or receiving backscatter signals 111b-111m from the tag 104 such as, without limitation, for example a base station, Wi-Fi access point, eNodeBs (eNBs), and/or any user equipment (UEs) that may be configured for such communications such as, without limitation, for example a mobile telephone, laptop, tablet computer, digital assistant, wearable computing device, vehicle or craft having communications functionality and indeed any form of mobile apparatus or system having communications functionality that enables it to at least transmit radio signals 110a to a backscatter tag 104 and/or receive radio signals, e.g. backscatter signals 111b-111c, from the backscatter tag 104. The tag 104 is shown in spatial relation to the plurality of APs 102a-102m, namely first, second and third access points 102a, 102b, 102c and/or m-th access point 102m. The first, second and third access points 102a, 102b, 102c may comprise, but are not limited to, Wi-Fi APs and/or eNBs and the like. In this example, the spatial relation of the tag 104 with the plurality of APs 102a-102m is that the tag 104 is located a distance $d_A$ 112a from AP 102a, a distance $d_B$ 112b from AP 102b, a distance $d_C$ 112c from AP 102C, and so on, and a distance $d_M$ 112m from AP 102m.

Although the localization system 100 may be described with respect to using APs and/or Wi-Fi APs, this is by way of example only and the invention is not so limited, it is to be appreciated by the skilled person that the localization system and localization techniques described herein do not necessarily require Wi-Fi compatibility, but may be used with any other type of AP and/or communication device capable of transmitting a localization signal to a backscatter tag 104 and capable of receiving a backscatter signal from the tag 104 in response to a transmitted localization signal, such devices may further include, without limitation, for example Wi-Fi APs, Bluetooth Gateways, indoor GSM hotspots, eNBs and the like and/or as the application demands.

The localization system 100 may include a cloud platform 106 that may include a localization apparatus 108a for estimating the location of the tag 104 based on distance information received from the APs 102a-102m with respect to the tag 104. The cloud platform 106 may include multiple computing devices, clients and/or servers networked together, where the localization apparatus 108a may be implemented on one of these multiple computing devices, clients and/or servers and the like. For example, the cloud platform 106 be based on, without limitation, for example any type of cloud computing system and/or topology, edge computing system and/or topology and/or both cloud and edge computing topology and the like as the application demands. As an example, the cloud platform 106 may be based on, without limitation, for example an on-premise edge-cloud system with the localization apparatus 108a implemented on an edge device of the edge-cloud system. The purpose of the edge device may be to implement the localization apparatus 108a and provide a localization service. Although the cloud platform 106 and localization apparatus 108a have been described using cloud computing and/or edge computing system, this is by way of example only and the localization system 100 is not so limited, it is to be appreciated by the skilled person that any type of networked computing topology/system may be used to implement the cloud platform 106 and/or localization apparatus 108a and the like. As an option, the cloud platform 106 or localization apparatus 108a may be further configured to control the coordination of the set of APs 102a-102m for transmitting a localization signal to the tag 104 and/or receiving the resulting backscatter signals from the tag 104. As another option, the localization system 100 may include a master AP 102a that includes localization apparatus 108b for estimating the location of the tag 104 based on distance information received from APs 102b-102m with respect to tag 104. For example, the first access point 102a may be configured to be a master AP and include localization apparatus 108b that may also control the coordination of the other APs 102b-102m of the set of APs 102a-102m when localizing the tag 104.

The localization system 100 using localization apparatus 108a or 108b may be configured to localize tag 104 using a localization coordination scheme that controls when APs of the set of APs perform a transmitter (Tx) or receiver (Rx) mode switching during multiple different time intervals. For example, in a certain time interval, the localization coordination scheme controls which APs in the set of APs 102a-102m are transmitters or receivers of the set of APs 102a-102m during different time intervals. At least one of the APs 102a from the set of APs 102a-102m dynamically switches to a Tx mode for transmitting a localization signal 110a in the certain time interval to the tag 104, and the other APs 102b-102m in the set of APs 102a-102m are configured to switch to an Rx mode for receiving and measuring the resulting backscatter signals 111b-111m in the certain time interval. Once the certain time interval is completed, another Tx/Rx mode switching takes place in which the transmission role of the APs change to another one or more APs 102b-102m of the set of APs 102a-102m in subsequent time intervals. In each time interval, each of the receiving APs 102b-102m (or APs in Rx mode) use the received backscatter signals to determine distance information (e.g. backscatter signal measurements or compound distance estimates) with respect to the tag 104 and the transmitting AP 102a (e.g. AP in Tx mode). During operation of the localization coordination scheme, the determined distance information is transmitted or streamed from each of the APs 102a-102m to the cloud-platform 108 and/or to the master AP 102a for use by localization apparatus 108a or 108b, respectively, in estimating at least three of the individual distances $d_A$ 112a, $d_B$ 112b, $d_C$ 112c and/or $d_M$ 112m and then calculating the location of the tag 104 using localization techniques/trilateration techniques.

The distance information may comprise or represent data representative of any type of information determined, observed and/or measured by one or more of the APs when receiving a backscatter signal from a tag 104 in relation to a localization signal transmitted to said tag 104 by another of the APs in the set of APs 102a-102m, where the distance information is for use in estimating the location of the tag 104 based on corresponding localization techniques (e.g. trilateration techniques and the like). The distance information may include, without limitation, for example phase information measured by an AP 102b in relation to the backscatter signal received from the tag 104, compound distances or compound distance information estimated by an AP 102b in relation to the backscatter signal received from the tag 104, and/or any other distance information measured and/or determined by an AP 102b in relation to the backscatter signal received from the tag 104 depending on the type of modulation scheme used for transmitting the localization signal and/or localization technique or trilateration technique used to locate the tag 104. Although phase-based ranging using phase modulation techniques in which the distance information received from the APs may include phase measurements in relation to the backscatter signal are described herein, this is for simplicity and by way of example only and the localization system 100 is not so limited, it is to be appreciated by the skilled person that the localization system 100 may use any other modulation techniques and/or ranging techniques based on, without limitation, for example frequency-modulated continuous wave (FMCW), Dual frequency continuous wave (DFCW), Multi-frequency continuous wave (MFCW), Time of Arrival (ToA), or received signal strength indication (RSSI) methods, combinations thereof, modifications thereto, and/or any other modulation/ranging technique in which the distance information associated with such techniques can be employed to resolve range ambiguity for localizing the tag 104.

For example, the localization system 100 may be configured to use DFCW or MFCW for ranging. in DFCW and MFCW ranging, the distance information may be obtained from the difference of the phase values of the received backscatter signal at each of the APs, when in Rx mode, when dual frequencies (for DFCW) or multiple frequencies (for MFCW) are used for tag illumination. In another example, the localization system 100 may be configured to use ToA based ranging. in ToA (or time-of flight) ranging, the distance information may be obtained by calculating the elapsed time between the beginning of a tag transmission, i.e. transmission of localization signal by the AP when in Tx mode during a time interval, and the beginning of the corresponding backscatter signal reception by the APs in Rx mode during the time interval. In a further example, the localization system 100 may be configured to use FMCW ranging. In FMCW ranging, an AP in Tx mode may transmit the localization signal as a frequency-modulated wave (for example, a frequency ramp) and distance information is obtained from the frequency difference between the backscatter transmission received from the tag and a reference signal of the localization signal at the same or different AP in Rx mode. Additionally, velocity information may be obtained simultaneously, by calculating the difference of the received frequency and the transmitted frequency (Doppler frequency shift). In another example, the localization system 100 may be configured to use RSSI ranging. In RSSI ranging, distance information can be obtained by the APs in Rx mode or localization apparatus 108a/108b by calculating the attenuation of the localization signal transmitted by an AP in Tx mode and/or corresponding backscatter signal from tag 104 (i.e. signal strength) at a known frequency using path loss formulas with an appropriate loss exponent.

For simplicity and as an example only, the localization system 100 may be a phase-based localization system in which a first AP 102a of the set of APs 102a-102m is configured to dynamically switch to the transmission/transmitting (Tx) mode for transmitting a first localization signal 110a to the tag 104 in a first time interval and the other APs 102a-102m of the set of APs 102a-102m remain in a reception/receiving (Rx) mode for receiving a first set of backscatter signals nib-1 nm from the tag 104 corresponding to the first localization signal 110a. Each AP 102b of the other APs 102b-102m in the set of APs 102a-102m determine the first distance information for the first AP 102a with respect to said each AP 102b based on receiving the corresponding backscatter signal nib of the first set of backscatter signals 110b-111m. The first set of phase estimates of the first distance information may be used to determine the compound distances between each of the APs 102b-102m, the tag 104 and the first AP 102a transmitting the first localization signal 110a.

The distance information for the first AP 102a in the Tx mode with respect to each of the other APs 102b-102m in the set of APs 102a-102m in the Rx mode may include a plurality of phase measurements associated with the resulting backscatter signal received by said each AP 102b. The distance information for the first AP 102a that is determined by each AP 102b of the other APs 102b-102m may be sent to a localization apparatus 108a/108b or other system for determining or calculating the compound distance between AP 102a, the tag 104 and each AP 102b of the other APs 102b-102m. For example, the first localization signal 110a may be a localization signal having N frequency tones, which is transmitted to the tag 104, which in response, a backscatter signal nib corresponding to the N frequency tones is transmitted from tag 104 and is received by the second AP 102b. The second AP 102b may measure a set of N phase measurements, each phase measurement corresponding to each of the N frequency tones. This information may be sent to the localization apparatus 108a/108b, which may calculate compound distance between the first AP 102a, the tag 104, and the second AP 102b, denoted $d_A+d_B$, based on:

$$d_A + d_B = \frac{c}{2\pi N} \sum_{n=1}^{N-1} \left| \frac{\varphi_{AB_n} - \varphi_{AB_{n+1}}}{f_n - f_{n+1}} \right|,$$

where N is the number of frequency tones of the localization signal 110a transmitted by the first AP 102a, $\varphi_{AB_n}$ is the n-th phase measurement measured by the second AP 102b of the backscatter signal nib corresponding to an n-th frequency tone, $f_n$, of the localization signal 110a transmitted by the first AP 102a, where $1 \leq n \leq N$. Similarly, each of the other APs 102c-102m in the Rx mode may each also measure a set of N phase measurements of the corresponding backscatter signals 111c-111m in response to the localization signal 110a, each phase measurement corresponding to each of the N frequency tones. Each of the other APs 102c-102m may send distance information based on corresponding set of phase measurements to the localization apparatus 108a/108b, which may calculate the corresponding compound distances between the first AP 102a, the tag 104, and each of the third AP 102c to M-th AP 102m, denoted $d_A+d_C, \ldots, d_A+d_M$.

More generally, for an i-th AP and j-th AP in the set of APs 102a-102m, distance information for the i-th AP when in Tx mode may be determined by the j-th AP when in Rx mode in the form of a set of N phase measurements of the backscatter signal of tag 104 measured by the j-th AP may further include calculating a compound distance between the i-th transmitting AP, the tag, and the j-th receiving AP, denoted $d_i+d_j$, based on:

$$d_i + d_j = \frac{c}{2\pi N} \sum_{n=1}^{N-1} \left| \frac{\varphi_{ij_n} - \phi_{ij_{n+1}}}{f_n - f_{n+1}} \right|,$$

where N is the number of frequency tones of the localization signal transmitted by the i-th AP, $\varphi_{ij_n}$ is the n-th phase measurement measured by j-th AP of the backscatter signal corresponding to an n-th frequency tone, $f_n$, of the localization signal transmitted by the i-th AP, where $1 \leq n \leq N$. In some embodiments, the localization signal 110a may be a multi-frequency tone localization signal having N different frequency tones, which is transmitted from an AP 102a when in Tx mode to the tag 104, which in response, a multi-tone backscatter signal 111b corresponding to the N frequency tones is transmitted from tag 104 and is received by at least a second AP 102b when in Rx mode. In another embodiment, the localisation signal transmitted from the first AP 102a when in Tx mode may include a number N of multiple and different sequentially-transmitted single-tone signals, each of the N signals may be transmitted simultaneously or sequentially. Although several examples of localization signals with N frequency tones have been described, this is by way of example only and the localization system 100 is not so limited, it is to be appreciated by the skilled person that any type of localization signal 110a may be used and transmitted by the AP 102a in Tx mode so long as each AP 102b-102m in Rx mode may receive the corresponding backscatter signal nib from the tag 104 and determine distance information suitable for sending to localization apparatus 108a/108b for use in determining a location estimate of the tag 104 using the corresponding localization/ranging technique.

In a second time interval different to the first time interval, a second AP 102b may be configured to dynamically switch from the Rx mode to the Tx mode for transmitting a second localization signal, and the first AP 102a is configured to dynamically switch to a Rx mode for receiving, along with any of the other APs 102c-102m in the set of APs 102a-102m, which may be maintained in the Rx mode, to receive second backscatter signals from the tag 104 corresponding to the second localization signal transmitted by the second AP 102b. The first AP 102a and the other APs 102c-102m in the set of APs 102a-102m determine a second distance information for the second AP 102b with respect to the tag 104 and the first or said any remaining APs based on receiving the backscatter signal. For example, the second distance information for the second AP 102b may be based on, without limitation, for example a second set of phase estimates of the backscatter signals measured at the APs 102a, 102c-102m, when in Rx mode, in response to the second AP 102b, when in Tx mode, transmitting the localization signal to the tag 104 in the second time interval. The second set of phase estimates of the second distance information may be used to determine the compound distances between each of the APs 102a, 102c-102m, the tag 104 and the second AP 102b transmitting the second localization signal.

As a result, the first and second distance information may be used to determine at least three compound distance estimates between at least three different APs 102a-102c (e.g. $d_A+d_B$, $d_B+d_C$, and $d_A+d_C$), which may be used by a localization apparatus 108a/108b to solve a set of simultaneous equations to estimate at least the three individual distances $d_A$ 112a, $d_B$ 112b, $d_C$ 112c and from these calculate/estimate the location of the tag 104 using localization/trilateration techniques. During additional time intervals, one or more additional APs 102c-102m from the set of APs 102a-102m excluding the first and second APs 102a and 102b may be selected to be switched into a Tx mode in respectively different time intervals where the first and second APs 102a and 102b switch and/or remain in the Rx mode and other APs not transmitting remaining in Rx mode. Thus, further compound distances in relation to the additional APs or additional time intervals may be used to further enhance the location estimate of the tag 104.

In an example, the localization system 100 may be a bistatic backscatter system that performs localization of the tag 104 in which the localization coordination scheme configured the APs in the set of APs 102a-102m to dynamically switch between the role of the transmitter (Tx) and receiver (Rx) of an AP for different APs in the set of APs 102a-102m over time or over different time intervals. By doing this in a systematic fashion, ambiguity in the distance information, such as ambiguity between path lengths, can be eliminated allowing for precise localization of the tag 104 or a device employing a backscatter radio. This technique could be used in a custom wireless system, but could also be used in existing wireless and/or telecommunication networks, for example to allow traditional Wi-Fi APs to be used for backscatter tag localization without the need to deploy any new or custom hardware.

In another example, the localization system 100 may be a backscatter localization radio system 100 that uses more than one AP 102a-102m (i.e. multistatic backscatter system) in which certain APs of the set of APs 102a-102m are configured to act as transmitters in different time intervals for transmitting a localization signal 110a to the tag 104, while the other APs of the set of APs 102a-102m are configured to act as receivers for receiving the backscatter signal 111b-111m from the tag 104 in response to the transmitted localization signal 110a. Then, after a period of time or in another time interval of a set of time intervals, the APs role of transmission (Tx) of the localization signal 110a and receiving (Rx) of the resulting backscatter signals 111b-111c will be switched to another AP of the set of APs 102a-102m. By using transmission/receiving mode switching from Tx to Rx in a coordinated manner, the APs 102a-102m can obtain multiple distance information (e.g. phase measurements or compound distance estimates) in different time intervals, and therefore resolve all ranging ambiguities enabling localization of the tag 104. This may be performed using trilateration techniques based on the received distance information (e.g. phase measurements) determined by each of the other APs 102b-102m when in receiving mode during each time interval that an AP is in transmitting mode.

The coordination of the mode switching of each of two or more of the APs in different time intervals can be achieved based on a localization coordination scheme such as, without limitation, for example, using: a) network time protocol (NTP) clients running on each of the APs where each time interval is performed for a pre-defined length of time and there may be a pre-defined number of time intervals where Tx/Tx mode switching takes place (e.g. pre-defined number of Tx/Rx rounds); b) one of the APs 102a of the set of APs 102a-102m acts as the master AP and sends out synchronization signals in a different RF or wired channel (control channel) to the other APs 102b-102c in the set of APs 102a-102m that the other APs 102b-102m listen to. The synchronization signaling may address which of the APs in the set of APs 102a-102m will be switching to Tx mode (e.g. taking over the transmitter role) in the next time interval (or next Round). For example, a digital bitstream with the AP's address (e.g. hardware MAC address, or software-defined address) that is to switch to the Tx mode for transmitting the localization signal may be included in the synchronization signal. The AP that is currently transmitting in the current time interval may then switch to a Rx mode automatically at the end of the current time interval; c) Tx/Rx mode switching could be performed randomly by each of the APs in the set of APs 102a-102m in which each of the APs 102a-102m randomly selects either "Tx" or "Rx" modes of operation for a set amount of time and then randomly switches to "Tx" or "Rx" modes, where the probability of operating in "Rx" mode is set to be greater (or higher) than the probability of operating in "Tx" mode, which reduces the number of concurrent transmitters at any instance or interval in time; and/or d) each of the APs 102a-102m requesting from a master AP 102a whether to enter a Tx mode or Rx mode during each of the multiple time intervals.

After the individual ranges/distances $d_A$, $d_B$, $d_C$ and/or $d_M$ are calculated and known, then trilateration methods/techniques can be applied for precise 2D or 3D location estimates of the tag 104 (e.g. using radius circle overlapping and the like). The processing of all distance information from the APs in Rx mode (e.g. received signal phases) should be performed to centrally in order to trilaterate a tag 104. In different embodiments, the localization of the tag 104 may be performed in various ways such as, without limitation, for example a) the APs 102a-102m may be configured to stream the distance information (e.g. received signal phases or other measurements) to cloud platform 106. The streaming may be performed via wired, optical, or RF backbone connection and the like. The cloud platform 106 may use localization apparatus 108a to centrally process the received distance information data, determine the individual distances, and perform the trilateration to localize or estimate the location of the tag 1o4; orb) a first AP 102a may act as a master AP and processes all the distance information data received from the APs 102a-102m, where the other APs 102b-102m may use a control channel to relay the extracted distance information data back to the master AP, e.g. the first AP 102a.

Figure 2A:
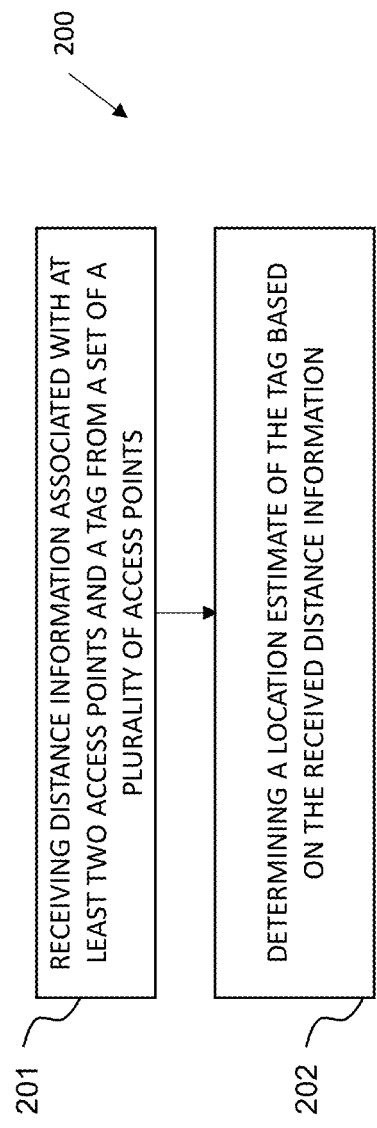
FIG. 2a is a flow diagram indicating processing operations according to some example embodiments.

FIG. 2a is a flow diagram illustrating example localization processing operations 200 that may be performed by, for example, the localization apparatus 108a or 108b of cloud platform 106 or a master AP 102a of FIG. 1 according to one or more example embodiments. The localization processing operations 200 may be performed by hardware, software, firmware or a combination thereof. In some embodiments, the localization processing operations 200 may be performed by one or more controllers or processors of the cloud platform 106 or master AP 102a, possibly under the control of computer-readable instructions (software code) stored on memory. In some situations, at least some of the localization processing operations 200 may be performed by systems other than the cloud platform 106 or master AP 102a, and indeed by any system or apparatus capable of communicating with the set of APs 102a-102m for operating on the distance information and localizing the tag 104.

A first operation 201 may comprise receiving distance information associated with at least two APs 102a-102b and a tag 104, the two access points 102a-102b of a plurality of access points 102a-102m or a set of access points 102a-102m.

A second operation 202 may comprise determining a location estimate of the tag based on the received distance information from the at least two access points 102a-102b.

If desired, additional distance information based on additional (redundant) observations or measurements can be obtained in each time interval. The additional observations can be used in noisy environments to improve ranging accuracy. For example, the at least two APs may determine additional distance information in different subsequent time intervals (also known as performing multiple "rounds"), where the same AP switches to a transmit mode for re-transmitting the localization signal to the tag 104 in a further or subsequent time interval and the same set of receiving APs, in each further or subsequent time interval, determines the additional distance information in response to receiving the resulting backscatter signal from the tag 104 for further reducing the measurement noise (e.g. phase measurement noise etc.). In another example, additional APs 102c-102m of the set of APs 102a-102m can participate in the ranging scheme to further enhance the position accuracy of the tag 104 in 2-dimensions (2D) or even in three-dimensions (3D). Transmit/receiver mode switching can be judiciously employed in the set of APs 102a-102m to separate the estimates of the compound distances between the at least two APs 102a-102b (e.g. $d_A$ and $d_B$) respectively.

Figure 2B:
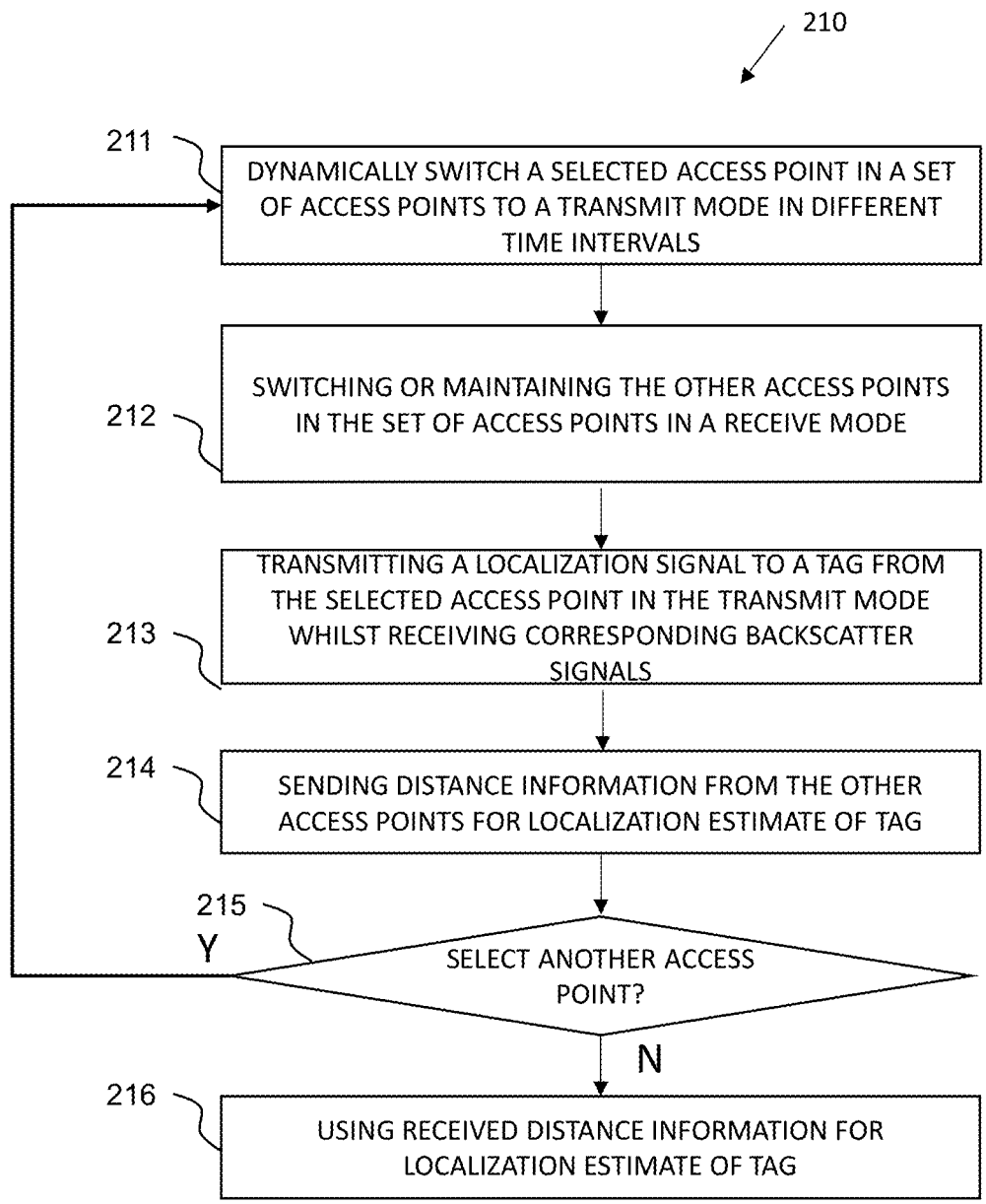
FIG. 2b is a flow diagram indicating processing operations according to some example embodiments.

FIG. 2b is a flow diagram illustrating an example localization coordination scheme 210 for use with localization process 200 of FIG. 2a that may be performed by, for example, the cloud platform 106, master AP 102a, and/or corresponding localization apparatus 108a or 108b of FIG. 1 according to one or more example embodiments. The localization coordination scheme 210 may be performed by hardware, software, firmware or a combination thereof. In some embodiments, the localization coordination scheme 210 may be performed by one or more controllers or processors of the cloud platform 106 or master AP 102a, possibly under the control of computer-readable instructions (software code) stored on memory. In some situations, at least some of the localization coordination scheme 210 may be performed by systems other than the cloud platform 106 or master AP 102a, and indeed by any system or apparatus capable of communicating with the set of APs 102a-102m for operating on the distance information and localizing the tag 104. Alternatively, the localization coordination scheme 210 may be automatically performed by each of the plurality of APs 102a-102m.

A first operation 211 may comprise, in each time interval of a plurality of different time intervals, dynamically selecting an AP 102a from the set of APs 102a-102m and switching the selected AP 102a in the set of APs 102a-102m to a transmit mode in said each time interval of the different time intervals.

A second operation 212 may comprise, in said each time interval for the selected AP 102a, switching or maintaining the other APs 102b-102m of the set of APs 102a-102m excluding the selected AP 102a in a receive mode.

A third operation 213 may comprise, in said each time interval for the selected AP 102a, transmitting from the selected AP 102a, when in the transmit mode, a localization signal to a tag 104 whilst the each of the other APs 102b-102m in the receive mode are configured for receiving a backscatter signal from the tag 104 in response to the transmitted localization signal. Each of the other APs 102b-102m in the receiving mode determine distance information based on the received backscatter signal from the tag 104. Each of the APs 102b-102m in the receive mode may send the determined distance information to the master AP 102a and/or cloud platform 106 or localization apparatus 108a/108b and the like for localization processing.

A fourth operation 214 may comprise, in said each time interval for the selected AP 102a, each of the other APs 102b-102m in the receive mode receiving the backscatter signal from the tag and determining distance information associated with the transmitting AP 102a, where the each of the other APs 102b-102m in receiving mode are configured for sending the determined distance information associated with the transmitting AP 102a for localization processing of the tag 104. Thus, in operation 214, the localization process 200 or apparatus 108a/108b may be configured for receiving the determined distance information from the other APs 102b-102m in the receive mode and further configured for performing a localization estimate of the tag 104 based on the received determined distance information. As an option, the localization process 200 may perform the location estimate of the tag 104 based on the received distance information that has been received so far up to the current time interval from the corresponding APs of the set of APs 102a-102m. The localization process 200 may estimate the location of the tag 104 using one or more localization or trilateration techniques.

A fifth operation 215 may comprise determining whether another AP 102b, other than the currently selected AP 102a, from the set of APs 102a-102m should be selected to switch to a transmit mode for transmitting a localization signal to the tag 104 with the other APs 102a, 102c-102m of the set of APs 102a-102m switched or maintained in a receive mode for receiving the corresponding backscatter signals from the tag 104. The determination may be based on having a minimum number of APs of the set of APs performing the role of transmitter of the localization signal in a different time interval, and/or based on a transmitting AP If another AP 102b is determined to be selected (e.g. 'Y'), then the localization coordination scheme 210 proceeds to perform first operation 211 in which another AP 102b is dynamically selected and switched in a further time interval of the plurality of different time intervals to a transmit mode. Operations 211-215 may proceed for the further time interval with the another AP 102b dynamically switched to a transmit mode as the transmitting AP and the other APs 102a, 102c-102m of the set of APs 102a-102m switched or maintained in the receiving mode. The currently selected AP 102a is switched to a receive mode in operation 212. If it is determined that no further APs are to be selected (e.g. 'N'), then the localization coordination process 210 proceeds to operation 216.

A sixth operation 216 may comprise using all of the received distance information from the corresponding APs of the set of APs 102a-102m that is received in the plurality of time intervals for estimating individual distances between at least three APs 102a-102c and the tag 104 (e.g. estimating compound distances $d_A+d_B$, $d_B+d_C$, and $d_A+d_C$ and using these to solve a set of simultaneous equations to estimate at least the three individual distances $d_A$ 112a, $d_B$ 112b, and $d_C$ 112c) and using the at least three individual distances to estimate the location of the tag 104 using one or more localization or trilateration techniques.

Figure 2C:
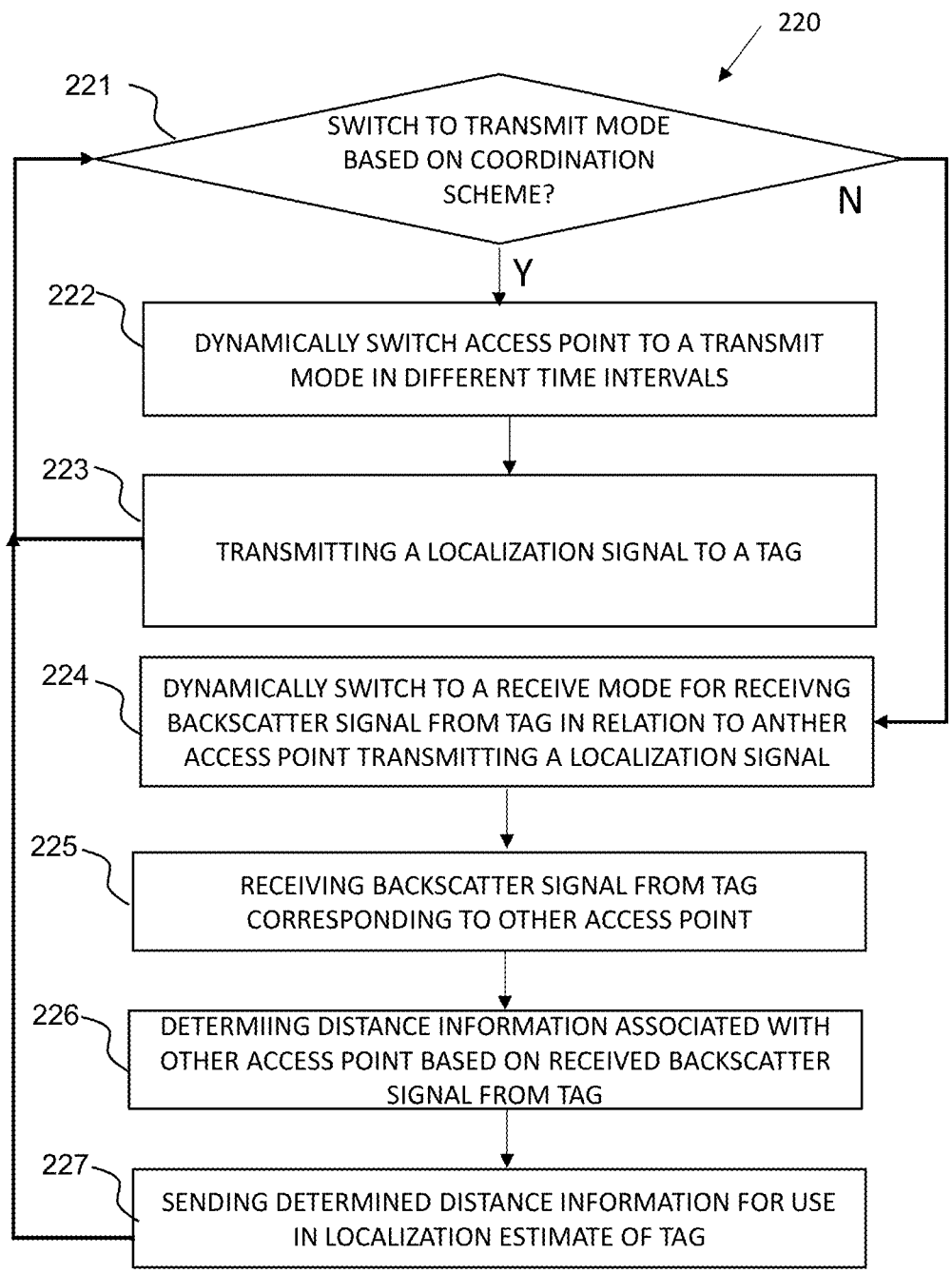
FIG. 2c is a flow diagram indicating processing operations according to some example embodiments.

FIG. 2C is a flow diagram illustrating an example AP localization process 220 for use with localization process 200 of FIG. 2a and/or localization coordination process 210 of FIG. 2b that may be performed by, for example, each AP of the set of APs 102a-102m of FIG. 1 according to one or more example embodiments. The AP localization process 220 may be performed within each AP of the set of APs 102a-102m by hardware, software, firmware or a combination thereof. In some embodiments, the AP localization process 220 may be performed by one or more controllers or processors of an AP, possibly under the control of computer-readable instructions (software code) stored on memory.

A first operation 221 may comprise, in a current time interval of a plurality of different time intervals, determining whether to switch from a transmit mode to a receive mode based on a localization coordination scheme such as, for example, localization coordination process 210 of FIG. 2b. For example, a master AP 102a may supervise or control the localization coordination scheme, where each AP may receive an instruction from a master AP 102a to switch from a receive mode to a transmit mode and/or vice versa for the current time interval. Alternatively, each of the APs may be configured to operate jointly according to a localization coordination scheme which specifies when an AP should be in transmit mode and when the AP should be in a receive mode, thus the AP may determine whether it should be in transmit mode based on the current time interval. Alternatively, if it has not done so already, each AP may request to become a transmitting AP and so send a request to a master AP 102a to switch to transmit mode, and may receive permission to become a transmitting AP during the localization of the tag 104. In any event, if the AP determines to switch to a transmit mode for the current time interval and/or based on a localization coordination scheme (e.g. 'Y'), then the AP localization process 220 proceeds to operation 222. If the AP does not determine to switch to a transmit mode for the current time interval or determines to switch to a receive mode for the current time interval (e.g. 'N'), then the AP localization process 220 proceeds to the fourth operation 224.

A second operation 222 may comprise, during the current time interval, dynamically switching the AP to a transmit mode for the current time interval for transmitting a localization signal to the tag 104.

A third operation 223 may comprise, during the current time interval, the AP transmitting the localization signal to the tag 104 during the current time interval. Once the AP has finished transmitting the localization signal to the tag 104 for the current time interval, the AP localization process 220 proceeds to the first operation 221 for determining whether to switch to transmit mode or receive mode for the next time interval and the like.

A fourth operation 224 may comprise, during the current time interval, dynamically switching the AP to a receive mode for receiving a backscatter signal from the tag 104 in response to another AP of the set of APs 102a-102m transmitting a localization signal to the tag 104 during the current time interval.

A fifth operation 225 may comprise, during the current time interval, the AP when in the receive mode receiving backscatter signal from the tag 104 corresponding to the localization signal transmitted from another AP.

A sixth operation 226 may comprise, during the current time interval, determining distance information associated with the other AP transmitting the localization signal based on the received backscatter signal from the tag 104. The distance information may include, without limitation, for example backscatter signal measurements in relation to the localization signal (e.g. phase measurements of the backscatter signal) for use by a localization process to determine a compound distance between the AP, tag 104 and the AP transmitting the localization signal in the current time interval for use in a location estimate of the tag 104; a compound distance estimate between the AP, the tag 104 and the AP transmitting the localization signal in the current time interval.

A seventh operation 227 may comprise, during or after the current time interval, sending the determined distance information associated each of one or more other APs transmitting localization signals to the tag 104 during the current time interval and/or other time intervals and the like. Once the distance information determined by the AP in relation to the current time interval has been sent, the AP localization process 220 proceeds to step 221 for determining whether to switch to a transmit mode or remain in the receive mode and the like. If it remains in the receive mode, this means another or different AP from the set of APs switches to a transmit mode for the next time instance/interval and the AP performs operations 221, 224-227 in which the AP determines and sends distance information associated with the different AP for use in localizing the tag 104.

For example, the AP may send the distance information associated with other APs to a master AP 102a, a cloud platform 106, corresponding localization apparatus 108a or 108b and/or any other system or apparatus performing localization of the tag 104 based on one or more localization or trilateration techniques and the distance information determined by the AP and other APs in the receive mode during the current time interval. For example, the localization process 200 or apparatus 108a/108b may be configured for receiving the determined distance information from the AP and/or other APs 102b-102m in the receive mode during the current time interval and further configured for performing a localization estimate of the tag 104 based on the received determined distance information from said APs. As an option, the localization process 200 or apparatus 108a/108b may perform the location estimate of the tag 104 based on the received distance information that has been received so far up to and including the current time interval from the corresponding receiving APs of the set of APs 102a-102m. The localization process 200 may estimate the location of the tag 104 using one or more localization or trilateration techniques based on the received distance information determined by the APs when in the receive mode.

Figure 3A:
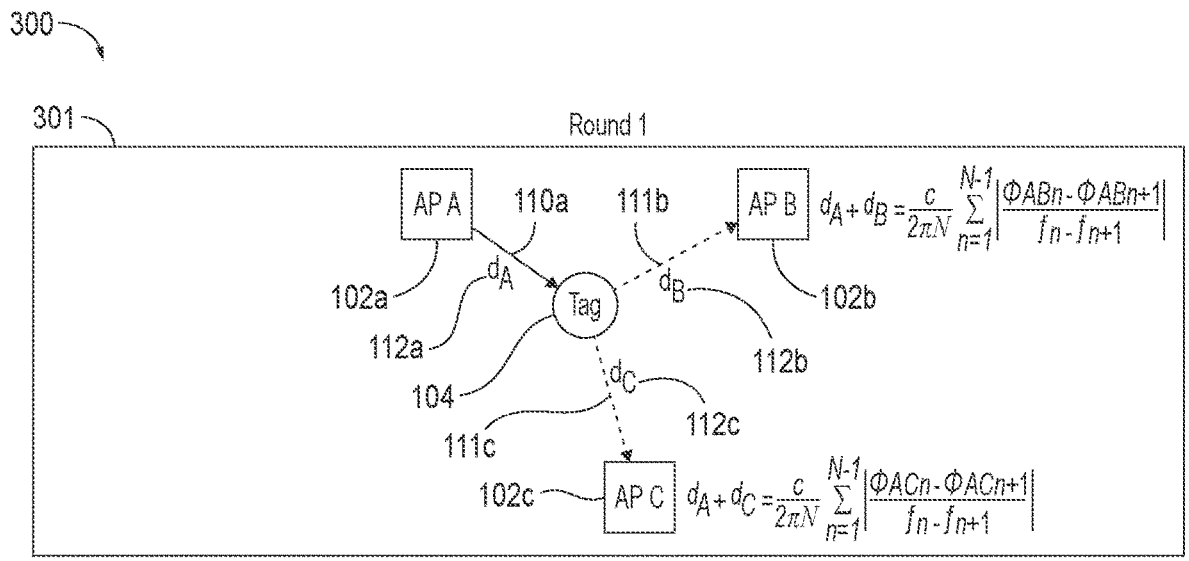
FIGS. 3A, 3B and 3C, collectively referred to as FIG. 3, are schematic diagrams of tag localization over different time intervals of a localization system according to some example embodiments.
Figure 3B:
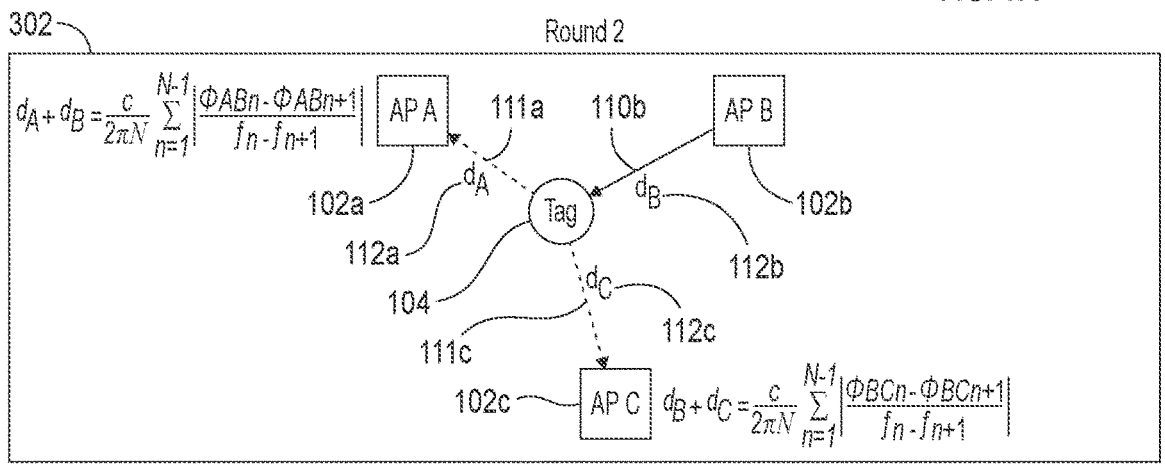
Figure 3C:
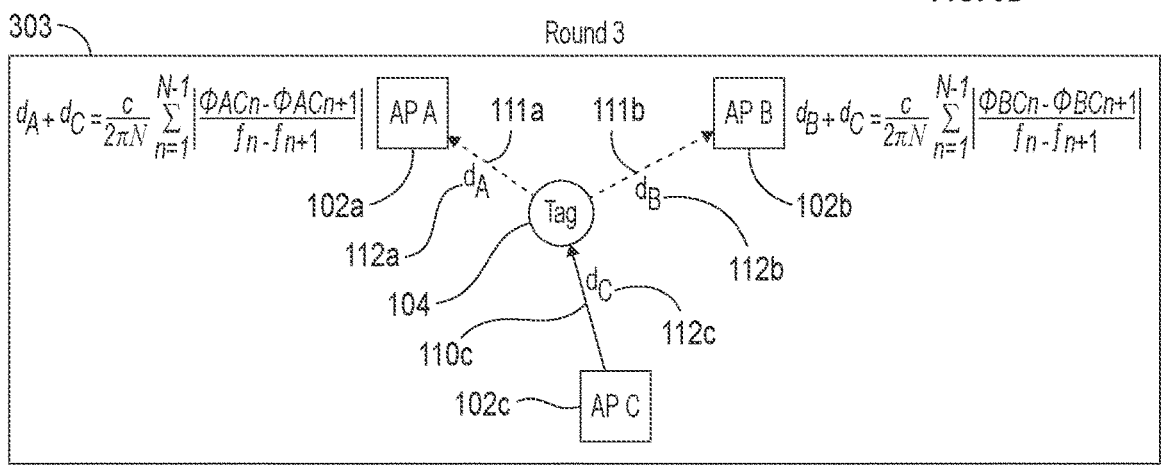

Referring now to FIG. 3, i.e. FIGS. 3A, 3B and 3C, an embodiment of a phase-based localization system 300 is shown based on the localization system 100 of FIG. 1 with three mode switching APs 102a-102c and a tag 104. Reference numerals from FIG. 1 are reused for the same or similar components. In this example, there are three mode-switching APs 102a-102C, denoted AP A 102a, AP B 102b, and AP C 102C, respectively. Although three APs 102a-102C are described in this embodiment, this is for simplicity and by way of example and the system 300 is not so limited, it is to be appreciated by the skilled person that the phase-based localization system 300 may use two or more APs for localizing the tag 104, or more than three APs may be used for enhancing the accuracy of the location estimate of the tag 104 when localizing the tag 104. The spatial relation of the tag 104 with the three APs 102a-102C is that the tag 104 is located a distance $d_A$ 112a from AP 102a, a distance $d_B$ 112b from AP 102b, and a distance $d_C$ 112c from AP 102C. Thus, localization or trilateration techniques can be used to estimate the location of the tag 104 when the distances $d_A$ 112a, $d_B$ 112b and $d_C$ 112C are estimated/determined.

In this embodiment, the three APS 102a-102c may be configured to coordinate tag localization during three time different intervals 301-303, denoted Round 1 301 in FIG. 3A, Round 2 302 in FIG. 3B and Round 3 303 in FIG. 3C. Although three different time intervals 301-303 are described, this is for simplicity and by way of example only and the system 300 is not so limited, it is to be appreciated by the skilled person that more than three different time intervals, or Rounds, may be performed by the system 300 and/or the coordinating APs of the system 300.

In FIG. 3, the three APs 102a-102c coordinate with each other for tag localization over the multiple different time intervals 301, 302 and 303 (e.g. Rounds 1, 2, and 3). In the first time interval 301, i.e. Round 1, the first AP 102a (e.g. AP "A") is configured to be in a Tx mode and transmits localization signal 110a to tag 104, where the second and third APs 102b and 102C (e.g. APs "B" and "C") are configured to be in a Rx mode. In this example, the first AP 102a (e.g. AP "A") emits a CW carrier frequency localization signal 110a, although in another embodiment this could be modulated by another data signal (e.g. the data signal may be a set of multi-tone signals with N tones and the like), which is then backscattered by the tag 104. During the backscatter operation, the tag 104 modulates a data signal onto the received CW carrier of the localization signal 110a by switching its antenna between two or more impedance loads, thereby modulating the amplitude and/or phase of RF energy that is scattered away from the tag 104 (in another embodiment any modulation could be used such as phase shift keying). In other embodiments, to reduce collisions with the original carrier, the tag 104 may also frequency shift its modulated data signal to a small frequency offset from the CW carrier of the localization signal 110a. The RF signal backscattered from the tag 104 may form a set of backscattered signals 110b-111c each of which may be received by the second and third APs 102b-102c (e.g. AP "B" and "C").

A first set of carrier phase estimates of each of the received backscatter signals 111b and 111c may then be calculated by the first and second APs 102b and 102c (e.g. AP "B" and "C"), respectively. The second and third APs 102b-102c may use the corresponding phase estimates of the first set of carrier phase estimates to provide range estimates for a first compound distance $d_A+d_B$ (e.g. the compound distance between the first AP 102a, the tag 104 and the second AP 102b) and a second compound distance $d_A+d_C$ (e.g. the compound distance between the first AP 102a, the tag 104 and the third AP 102c), respectively. It is noted, that for the first time interval, the compound distances $d_A+d_B$ and compound distance $d_A+d_C$, cannot yet be used to separate out the individual distances $d_A$ 112a, $d_B$ 112b and $d_C$ 112c between each of the APs 102a-102c and the tag 104.

For example, should the tag 104 modulate the backscatter signal with multiple frequency tones, then each of the backscatter signals 111b and 111c received by the second and third APs 102b and 102c may be used to estimate a set of multiple phase differences corresponding to the multiple received frequency tones, i.e. a phase difference is estimated for each received frequency tone modulated onto the backscatter signal. Thus, the compound distances $d_A+d_B$ and $d_A+d_C$ can be determined based on:

$$d_A + d_B = \frac{c}{2\pi N} \sum_{n=1}^{N-1} \left| \frac{\varphi_{AB_n} - \varphi_{AB_{n+1}}}{f_n - f_{n+1}} \right|, \text{ and}$$

$$d_A + d_C = \frac{c}{2\pi N} \sum_{n=1}^{N-1} \left| \frac{\varphi_{AC_n} - \varphi_{AC_{n+1}}}{f_n - f_{n+1}} \right|,$$

where N is the number of frequency tones modulated onto the backscatter signal transmitted from tag 104 and received as backscatter signals 111b and 111c by the second and third APs 102b and 102C, $\varphi_{AB_n}$ is the n-th phase measurement measured by the second AP 102b of the backscatter signal nib corresponding to an n-th frequency tone, $f_n$, in response to localization signal 110a transmitted by the first AP 102a, and, $\varphi_{Ac_n}$, is the n-th phase measurement measured by the third AP 102c of the backscatter signal 111c corresponding to an n-th frequency tone, $f_n$, in response to localization signal 110a transmitted by the first AP 102a, where $1 \leq n \leq N$.

This means, at least another time interval or Round may be required in which a different AP 102b switches to a Tx mode for transmitting the localization signal and the other APs 102a and 102c switch or remain in a Rx mode for receiving corresponding backscatter signals for use in measuring the phase and estimating further compound distances, which may be used to resolve or separate the individual distances $d_A$ 112a, $d_B$ 112b and $d_C$ 112c and thus localize the tag 104.

As an option, the second and third APs 102b-102c may send their corresponding phase estimates in the set of phase estimates as distance information to a localization apparatus 108a/108b for calculating the range estimates (i.e. compound distance $d_A+d_B$ and compound distance $d_A+d_C$), and when further distance information is received, localizing the tag 104. As another option, the second and third APs 102b-102c may send their corresponding range estimates (e.g. the compound distances $d_A+d_B$ and compound distance $d_A+d_C$) as distance information in relation to the first AP 102a to the localization apparatus 108a/108b for use in localizing the tag 104 when additional range estimates enable localization of the tag 104 to be estimated (e.g. compound distance $d_B+d_C$ between AP B 102b, tag 104, and AP C 102c).

In the second time interval 302, i.e. Round 2, a Tx/Rx mode switching of two of the APs 102a-102b of the set of APs 102a-102c takes place during Round 2 302. In Round 2 302, the first AP 102a (e.g. AP "A") is switched from a Tx mode to an Rx mode, and the second AP 102b (e.g. AP "B") is switched from the Rx mode to a Tx mode. The remaining third AP 102C (e.g. AP "C") is maintained in the Rx mode. This Tx/Rx mode switching could be after a fixed amount of time or could be triggered by successful signal reception of the second AP 102ba and third AP 102c (e.g. AP "B" and "C") in relation to the backscatter signals nib and inc. Although the second AP 102b (e.g. AP "B") is switched from the Rx mode to a Tx mode in Round 2, this is by way of example only, it is to be appreciated by the skilled person that the third AP 102c (e.g. AP "C") could have been switched from the Rx mode to a Tx mode, with the second AP 102b (e.g. AP "B") remaining in Rx mode.

In the second Round 302, the second AP 102b (AP "B") emits a second CW carrier localization signal nob which is backscattered by the tag 104 as a set of backscatter signals 111a and 111c that are received by the first and third APs 102a and 102c (e.g. AP "A" and "C"), where the associated carrier phases are estimated. It is noted, that there is now an additional observation from the third AP 102c (e.g. AP "C") in which another range estimate for compound distance $d_B+d_C$ (e.g. the distance between the second AP 102b, the tag 104, and the third AP 102c). Thus, therefore completing a system of 3 linear equations with 3 unknowns, which can be solved to provide individual range estimates for the distances $d_A$ 112a, $d_B$ 112b and $d_C$ 112C between the tag 104 and the three APs 102a, 102b and 102c so the tag 104 may be localized.

For example, in Round 2 302, should the tag 104 modulate the backscatter signal in response to the transmitted localization signal nob with multiple frequency tones, then each of the backscatter signals 111a and Inc received by the first and third APs 102a and 102c may be used to estimate a set of multiple phase differences corresponding to the multiple received frequency tones, i.e. a phase difference is estimated for each received frequency tone modulated onto the backscatter signal. Thus, the compound distances $d_B+d_A$ and $d_B+d_C$ can be determined based on:

$$d_B + d_A = \frac{c}{2\pi N} \sum_{n=1}^{N-1} \left| \frac{\varphi_{BA_n} - \varphi_{BA_{n+1}}}{f_n - f_{n+1}} \right|, \text{ and}$$

$$d_B + d_C = \frac{c}{2\pi N} \sum_{n=1}^{N-1} \left| \frac{\varphi_{BC_n} - \varphi_{BC_{n+1}}}{f_n - f_{n+1}} \right|,$$

where N is the number of frequency tones modulated onto the backscatter signal transmitted from tag 104 and received as backscatter signals 111a and 111c by the first and third APs 102a and 102C, $\varphi_{BA_n}$ is the n-th phase measurement measured by the first AP 102a of the backscatter signal 111a corresponding to an n-th frequency tone, $f_n$, in response to localization signal nob transmitted by the second AP 102b, and, $\varphi_{BC_n}$, is the n-th phase measurement measured by the third AP 102c of the backscatter signal 111c corresponding to an n-th frequency tone, $f_n$, in response to localization signal nob transmitted by the second AP 102b, where $1 \leq n \leq N$.

As an option or if desired, additional (redundant) phase measurements/observations can be obtained in the same time interval or Round, as well as during additional time intervals or rounds such as for example, a third time interval 303 (e.g. Round 3), where another Tx/Rx mode switching of two of the APs 102c and 102b takes place. In Round 3, the third AP 102C (e.g. AP "C") is switched from an Rx mode to a Tx mode and the second AP 102b (e.g. AP "B") is switched from the Tx mode to an Rx mode. The remaining first AP 102a (e.g. AP "A") is maintained in the Rx mode.

In the third Round 303, the third AP 102c (AP "C") emits a third CW carrier localization signal 110c which is backscattered by the tag 104 as a set of backscatter signals 111a and 111b that are received by the first and second APs 102a and 102b (e.g. AP "A" and "B"), where the associated carrier phases are estimated. It is noted, that there is now additional but duplicated observations from the first and second APs 102a and 102b (e.g. AP "A" and AP "B") in relation to the third AP 102c (e.g. AP "C"), where the additional range estimates for compound distance $d_A+d_C$ (e.g. the distance between the first AP 102a, the tag 104, and the third AP 102c) and compound distance $d_B+d_C$ (e.g. the distance between the second AP 2b, the tag 104, and the third AP 102c). These additional observations can be used in noisy environments to improve ranging accuracy. Additionally, as an option multiple time intervals or Rounds can be performed by the same set of APs 102a-102c, which can further reduce the measurement noise. In other embodiments, additional APs can participate in the localization system 300 in which further ranging estimates may be performed, which further enhances the position accuracy of the tag 104 in 2D or even in 3D.

Figure 4:
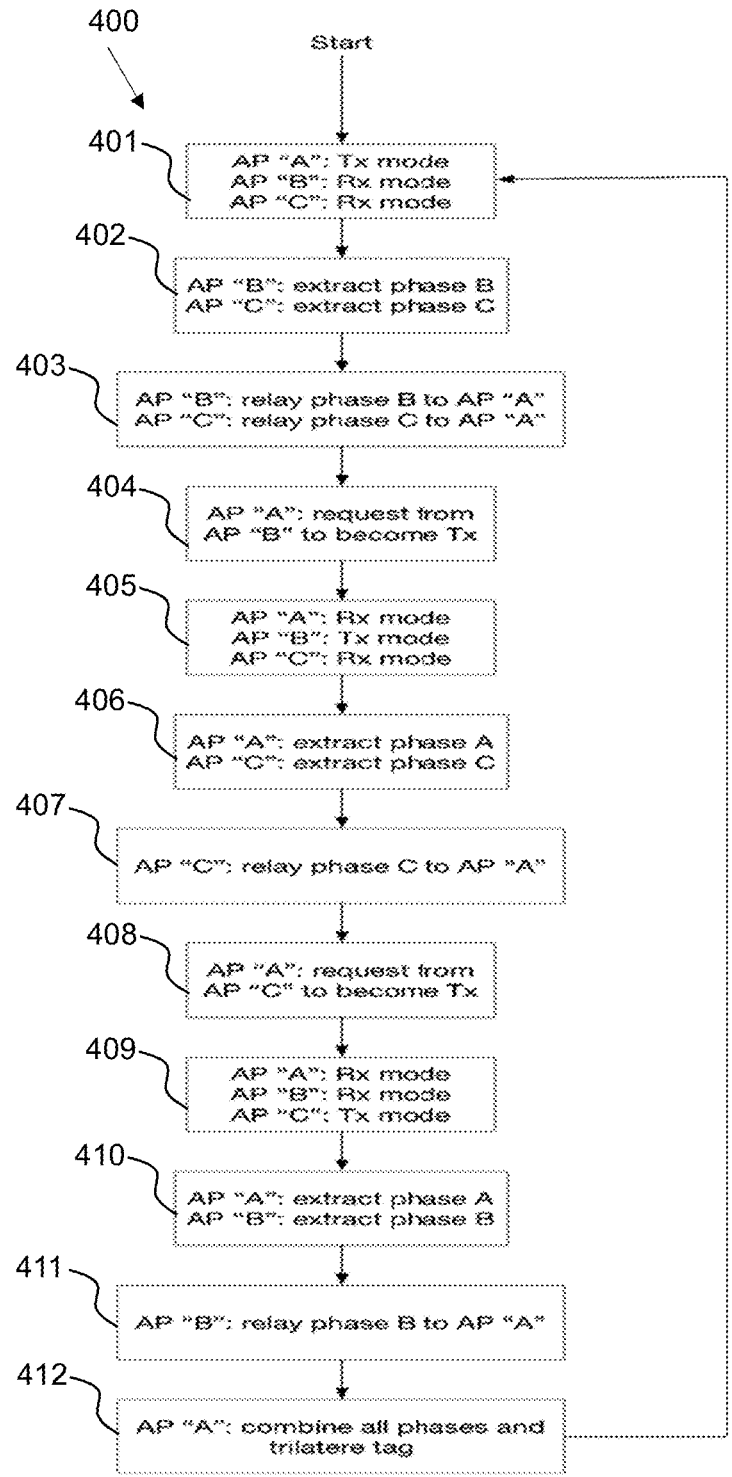
FIG. 4 is a flow diagram indicating processing operations according to some example embodiments.

FIG. 4 illustrates another example localization process 400 for localizing a backscatter tag using a plurality of APs and phase-based ranging. In this example, there are three APs denoted AP "A", AP "B", and AP "C", where AP "A" is a master AP and receives distance information (e.g. phase measurements) from AP "B" and AP "C" for processing and localizing the tag.

In operation 401, in a first time interval or round, the AP "A" is switched to a Tx mode, with the AP "B" and "C" switched in a Rx mode. In the first time interval or round, AP "A" transmits a localization signal to the tag and in response, the tag transmits a backscatter signal that is received by AP "B" and "C".

In operation 402, in the first time interval, AP "B" measures/extracts a phase B from the backscatter signal received by AP "B", and AP "C" measures/extracts a phase C from the backscatter signal received by AP "C".

In operation 403, in the first time interval, AP "B" relays the phase B to AP "A" and AP "C" relays phase C to AP "A".

In operation 404, AP "A" receives a request from AP "B" to switch to Tx mode and become the transmitter in the second time interval or round. Alternatively, AP "A" requests AP "B" to switch to Tx mode in the second time interval or round.

In operation 405, in the second time interval or round, AP "A" is switched to the Rx mode, with the AP "B" switched in the Tx mode and "C" switched in the Rx mode. In the second time interval or round, AP "B" transmits a second localization signal to the tag and in response, the tag transmits a second backscatter signal that is received by AP "B" and "C".

In operation 406, in the second time interval, AP "A" measures/extracts a phase A from the second backscatter signal received by AP "A", and AP "C" measures/extracts another phase C from the second backscatter signal received by AP "C".

In operation 407, in the second time interval, AP "C" relays the phase C to AP "A", and AP "A" already has phase A.

In operation 408, AP "A" receives a request from AP "C" to switch to Tx mode and become the transmitter in the third time interval or round. Alternatively, AP "A" requests AP "C" to switch to Tx mode in the third time interval or round.

In operation 409, in the third time interval or round, AP "A" is switched to the Rx mode, AP "B" switched in the Rx mode and AP "C" is switched in the Tx mode. In the second time interval or round, AP "C" transmits a third localization signal to the tag and in response, the tag transmits a third backscatter signal that is received by AP "A" and "B".

In operation 410, in the third time interval/, AP "A" measures/extracts a further phase A from the third backscatter signal received by AP "A", and AP "B" measures/extracts another phase B from the third backscatter signal received by AP "B".

In operation 411, in the third time interval, AP "B" relays the phase B to AP "A", and AP "A" already has the further phase A.

In operation 412, in the third time interval, AP "A" may combine all the measured/extracted phases to estimate the individual distances $d_A$, $d_B$ and $d_C$ of APs "A", "B", "C" with respect to the tag and subsequently estimate the location of the tag by trilaterating the individual distances.

Although the systems 100 and 300 and processes 200, 210, 220 and 400 as described with reference to FIGS. 1 to 4 may have been described using phase-based ranging, this is by way of example only and these systems 100 and 300 and/or processes 200, 210, 220 and 400 are not so limited, it is to be appreciated by the skilled person that any other type of ranging may be used and combined with the coordinated Tx/Rx mode switching to separate out at least the distance estimates $d_A$, $d_B$, and $d_C$ and the like. Such other types of ranging techniques may be performed where each of the APs, when in Rx mode, may at least perform measurements associated with the ranging technique on the received backscatter signal in which the measurements taken in each time interval may be used to determined compound distances between each AP, the tag and the AP in Tx mode for said each time interval. For example, the systems 100 and/or 300 and processes 200, 210, 220 and/or 400 may be configured to use other types of ranging based on, without limitation, for example frequency-modulated continuous wave (FMCW), Dual frequency continuous wave (DFCW), Multi-frequency continuous wave (MFCW), Time of Arrival (ToA), and/or received signal strength indication (RSSI) methods, and/or any other type of ranging method/technique or system that can be employed to resolve range ambiguity of the tag 104, and so localize the tag 104.

The localization systems 100 and 300 and/or processes 200, 210, 220 and 400 as described with reference to FIGS. 1 to 4 may be further modified to localize multiple tags in a tag network. For example, the tag network may comprise a plurality of tags, in which each tag may transmit a backscatter signal in response to receiving a localization signal transmitted from an AP in Tx mode. In order to prevent interference between backscatter signals of multiple tags that may be received by each of those APs of the set of APs 102a-102m when in Rx mode in response to a localization signal 110a transmitted by one of the APs 102a during a certain time interval, each of the tags in the tag network may use a multiple access communication protocol for separating the backscatter signals of the tags. For example, multiple access can be provided to multiple tags existing in the same tag network using multiple access/multiplexing schemes such as, without limitation, for example Code Division Multiple Access (CDMA), Frequency Division Multiple Access (FDMA), Time-Domain Multiple Access (TDMA), Space Division Multiple Access (SDMA), any other multiple access or multiplexing scheme for minimizing interference of backscatter signals between tags of the multistatic network, and/or a combination of any of these multiple access/multiplexing schemes. As an option, for example, existing wireless standard protocols could be employed, for example, Wi-Fi using the above localization schemes as outlined.

Figure 5:
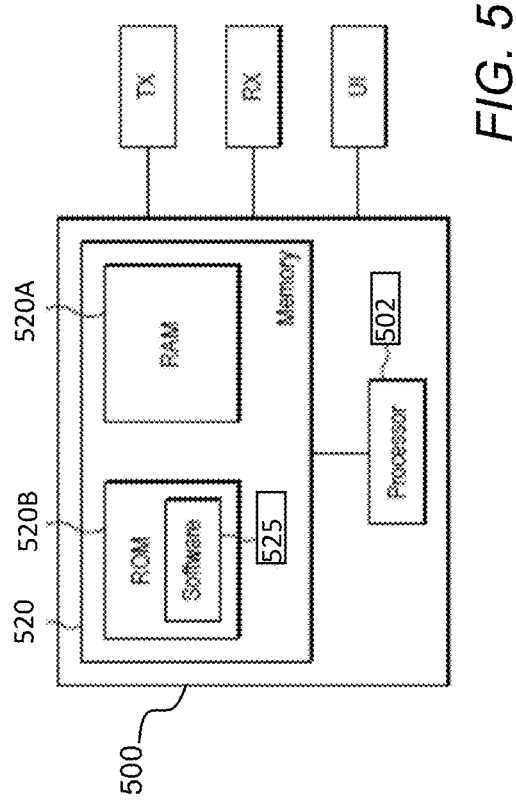
FIG. 5 is a block diagram of an apparatus which may be configured to operate in accordance with example embodiments.

FIG. 5 shows an apparatus 500 according to some example embodiments, which may be part of an access point and/or cloud platform and the like for implementing the apparatus and/or methods as described herein. The apparatus 500 may be configured to perform the operations described herein, for example operations described with reference to any disclosed process and/or apparatus. The apparatus 500 comprises at least one processor 502 and at least one memory 520 directly or closely connected to the processor. The memory 520 includes at least one random access memory (RAM) 520a and at least one read-only memory (ROM) 520b. Computer program code (software) 525 is stored in the ROM 520b. The apparatus may be connected to a transmitter (TX) and a receiver (RX). The apparatus may, optionally, be connected with a user interface (UI) for instructing the apparatus and/or for outputting data. The at least one processor 502, with the at least one memory 520 and the computer program code 525 are arranged to cause the apparatus to at least perform at least the method according to any preceding process, for example as disclosed in relation to the flow diagrams or operations of any of FIGS. 1 to 4 and related features thereof.

Figure 6:
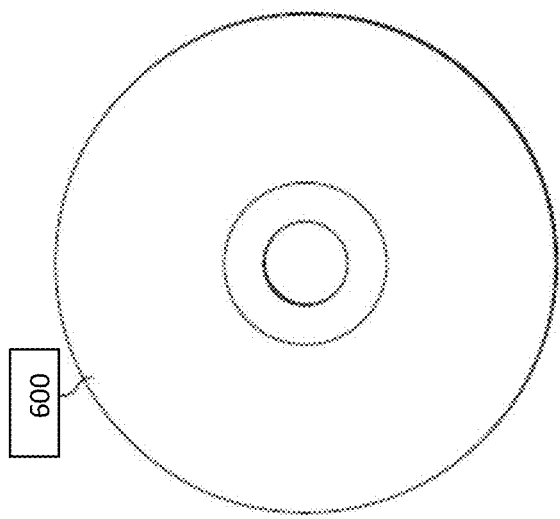
FIG. 6 is an example of a non-transitory medium on which a computer program may be stored for performing operations in accordance with example embodiments.

FIG. 6 shows a non-transitory media 600 according to some embodiments. The non-transitory media 600 is a computer readable storage medium. It may be e.g. a CD, a DVD, a USB stick, a blue ray disk, etc. The non-transitory media 600 stores computer program code, causing an apparatus to perform the method of any preceding process for example as disclosed in relation to the flow diagrams and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as Wi-Fi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus, comprising: at least one processor; and at least one memory including computer program code which, when executed by the at least one processor, causes the apparatus:
to receive distance information associated with at least two access points, APs, from a set of APs, wherein the distance information associated with each AP of the at least two APs is determined based on:
dynamically switching the role of said each AP in different time intervals to a transmission mode for transmitting a localization signal to a tag, with the other APs in the set of APs switched to a receiving mode for receiving a backscatter signal from the tag in response to the transmitted localization signal from said each AP, wherein, for each time interval, the AP in the transmission mode is excluded from being in the receiving mode and the other APs in the receiving mode are excluded from being in the transmission mode;
for each time interval, determining, by the other APs in the receiving mode, distance information with respect to the AP in the transmission mode based on the received backscatter signals corresponding to the transmitted localization signal from said AP; and
to determine a location estimate of the tag based on the received distance information with respect to each of at least two different APs when in the transmission mode in different respective time intervals.

2. The apparatus of claim 1, wherein the distance information associated with an AP comprises data representative of:
one or more backscatter signal measurements performed by another AP in receiving mode when said AP is in transmission mode; or
a compound distance estimate with respect to said AP, the tag and the another AP that is performed by said another AP in receiving mode when said AP is in transmission mode.

3. The apparatus of claim 1, wherein:
the apparatus is further configured for coordinating, from a set of time intervals, when APs from the set of APs dynamically switch between the transmission mode and the receiving mode; and
the set of APs are each configured to randomly switch between the transmitting mode and the receiving mode, wherein the probability of each AP in the set of APs randomly switching to the receiving mode being greater than the probability of each AP in the set of APs randomly switching to the transmitting mode.

4. The apparatus of claim 1, wherein:
the apparatus is further configured for coordinating, from a set of time intervals, when APs from the set of APs dynamically switch between the transmission mode and the receiving mode; and
a designated AP of the set of APs is configured to coordinate the dynamic switching of at least two APs in the set of APs between the transmitting mode to the receiving mode over a set of two or more time intervals, wherein each time interval in the set of time intervals has one of the at least two APs switched in the transmitting mode and the other of the at least two APs switched in the receiving mode.

5. The apparatus of claim 1, wherein one of at least two APs from the set of APs is configured to dynamically switch to the transmission mode during a time interval different to the other of said at least two APs and dynamically switch to a receiving mode before or after the time interval.

6. The apparatus of claim 1, wherein:
a first AP of the set of APs is configured to dynamically switch to the transmission mode for transmitting a first localization signal to the tag in a first time interval and the other APs of the set of APs remain in the receiving mode for receiving a first backscatter signal from the tag corresponding to the first localization signal, wherein each AP of the other APs in the set of APs determine distance information for the first AP with respect to said each AP based on receiving the first backscatter signal; and
a second AP of the set of APs is configured to dynamically switch from a receiving mode to a transmission mode for transmitting a second localization signal to the tag in a second time interval different to the first time interval, and the first AP is configured to dynamically switch to the receiving mode for receiving, along with any other APs in the set of APs in the receiving mode, to receive a second backscatter signal from the tag corresponding to the second localization signal, wherein the first AP and said any remaining APs in the set of APs determine distance information for the second AP with respect to the first or said any remaining APs based on receiving the second backscatter signal;
wherein receiving distance information for each AP in the set of APs further comprises:
receiving distance information for the first AP with respect to one or more of the other APs of the set of APs during the first time interval; and
receiving distance information for the second AP with respect to one or more of the first AP and any remaining APs during the second time interval; and
wherein determining a location of the tag further comprises:
determining the location of the tag based on the distance information received in the first and second time intervals.

7. The apparatus of claim 1, wherein a number of APs configured for transmitting a localization signal to the tag is increased based on an accuracy requirement of the location estimate.

8. The apparatus of claim 1, wherein a number of time intervals for APs to be dynamically switched to the transmission mode for transmitting a localization signal to the tag is increased based on a required reduction in measurement noise in relation to the distance information.

9. The apparatus of claim 1, wherein each AP in the set of APs receiving the backscatter signal from the tag determines distance information for the transmitting AP with respect to said each AP based on calculating carrier phases of the received backscatter signal resulting from said APs transmitting localization signals to the tag, and said each AP sending said determined distance information to said apparatus.

10. The apparatus of claim 9, wherein the localization signal transmitted from an AP in the set of APs in the transmission mode further includes multiple frequency tones, and the APs in the set of APs in the receiving mode each receive a backscatter signal from the tag in response to the multiple frequency tones of the localization signal transmitted to the tag, the received distance information for the AP in the transmission mode with respect to each of the APs in the set of APs in the receiving mode includes a plurality of phase measurements associated with the resulting backscatter signals.

11. The apparatus of claim 1, wherein the determining the distance information for an AP further comprises:
  determining distance information for an i-th AP further comprising calculating a compound distance between an i-th transmitting AP, the tag, and a j-th receiving AP, denoted $d_i+d_j$, based on:

$$d_i + d_j = \frac{c}{2\pi N} \sum_{n=1}^{N-1} \left| \frac{\varphi_{ij_n} - \varphi_{ij_{n+1}}}{f_n - f_{n+1}} \right|,$$

where N is a number of frequency tones of a localization signal transmitted by the i-th AP, $\varphi_{ij_n}$ is the n-th phase measurement measured by j-th AP of the backscatter signal corresponding to an n-th frequency tone, $f_n$, of the localization signal transmitted by the i-th AP, where $1 \leq n \leq N$.

12. The apparatus of claim 1, wherein the tag is part of a multistatic network comprising a plurality of tags, wherein said tag is configured to modify the backscatter signal transmitted from the tag based on at least one multiplexing/multiple access scheme from the group of:
  code division multiple access;
  frequency division multiple access;
  time division multiple access;
  space division multiple access; and
  any other multiple access or multiplexing scheme for minimizing interference of backscatter signals between tags of the multistatic network.

13. The apparatus of claim 1, wherein the distance information for each AP received from one or more of the APs is based on measurements of backscatter signals by said one or more APs in relation to at least one from the group of:
  phased-based localization or ranging;
  frequency-modulated continuous wave, FMCW, based localization or ranging;
  dual frequency continuous wave, DFCW, based localization or ranging;
  multi-frequency continuous wave, MFCW, based localization or ranging;
  time of arrival, ToA, based localization or ranging;
  received signal strength indication, RSSI, based localization or ranging;
  or any other type of localization or ranging technique.

14. A method comprising:
  receiving distance information associated with at least two access points, APs, in a set of APs, wherein the distance information associated with each AP of the at least two APs is determined based on:
    dynamically switching the role of said each AP in different time intervals to a transmission mode for transmitting a localization signal to a tag, with the other APs in the set of APs switched to a receiving mode for receiving a backscatter signal from the tag in response to the transmitted localization signal from said each AP, wherein, for each time interval, the AP in the transmission mode is excluded from being in the receiving mode and the other APs in the receiving mode are excluded from being in the transmission mode; and
    for each time interval, determining, by the other Aps in the receiving mode, distance information with respect to the each AP in the transmission mode based on received backscatter signals associated with the transmitted localization signal from said each AP; and
  determining a location estimate of the tag based on the received distance information with respect to each of at least two different APs when in the transmission mode in different respective time intervals.

15. The method of claim 14, wherein the distance information associated with an AP comprises data representative of:
  one or more backscatter signal measurements performed by another AP in receiving mode when said AP is in transmission mode; or
  a compound distance estimate with respect to said AP, the tag and the another AP that is performed by said another AP in receiving mode when said AP is in transmission mode.

16. The method of claim 14, wherein:
  the method further comprises coordinating, from a set of time intervals, when APs from the set of APs dynamically switch between the transmission mode and the receiving mode; and
  the set of APs are each configured to randomly switch between the transmitting mode and the receiving mode, wherein the probability of each AP in the set of APs randomly switching to the receiving mode being greater than the probability of each AP in the set of APs randomly switching to the transmitting mode.

17. The method of claim 14, wherein:
  the method further comprises coordinating, from a set of time intervals, when APs from the set of APs dynamically switch between the transmission mode and the receiving mode; and
  a designated AP of the set of APs is configured to coordinate the dynamic switching of at least two APs in the set of APs between the transmitting mode to the receiving mode over a set of two or more time intervals, wherein each time interval in the set of time intervals has one of the at least two APs switched in the transmitting mode and the other of the at least two APs switched in the receiving mode.

18. A computer program comprising instructions for causing an apparatus to perform at least the following:
  receiving distance information associated with at least two access points, APs, in a set of APs, wherein the distance information associated with each AP of the at least two APs is determined based on:
    dynamically switching the role of said each AP in different time intervals to a transmission mode for transmitting a localization signal to a tag, with the other APs in the set of APs switched to a receiving mode for receiving a backscatter signal from the tag in response to the transmitted localization signal from said each AP, wherein, for each time interval, the AP in the transmission mode is excluded from being in the receiving mode and the other APs in the receiving mode are excluded from being in the transmission mode; and for each time interval, determining, by the other Aps in the receiving mode, distance information with respect to the AP in the transmission mode based on received backscatter signals associated with the transmitted localization signal from said each AP; and determining a location estimate of the tag based on the received distance information with respect to each of at least two different APs when in the transmission mode in different respective time intervals.

19. The computer program of claim 18, wherein the distance information associated with an AP comprises data representative of:

one or more backscatter signal measurements performed by another AP in receiving mode when said AP is in transmission mode; or a compound distance estimate with respect to said AP, the tag and the another AP that is performed by said another AP in receiving mode when said AP is in transmission mode.

20. The computer program of claim 18, wherein:

the method further comprises coordinating, from a set of time intervals, when APs from the set of APs dynamically switch between the transmission mode and the receiving mode; and the set of APs are each configured to randomly switch between the transmitting mode and the receiving mode, wherein the probability of each AP in the set of APs randomly switching to the receiving mode being greater than the probability of each AP in the set of APs randomly switching to the transmitting mode.

* * * * *